(12) United States Patent
Holt et al.

(10) Patent No.: US 6,701,305 B1
(45) Date of Patent: Mar. 2, 2004

(54) METHODS, APPARATUS AND COMPUTER PROGRAM PRODUCTS FOR INFORMATION RETRIEVAL AND DOCUMENT CLASSIFICATION UTILIZING A MULTIDIMENSIONAL SUBSPACE

(75) Inventors: Fredrick Baden Holt, Seattle, WA (US); Anne Shu-Wan Kao, Bellevue, WA (US); Daniel John Pierce, Woodinville, WA (US); Stephen Robert Poteet, Bellevue, WA (US); Yuan-Jye Wu, Issaquah, WA (US)

(73) Assignee: The Boeing Company, Seattle, WA (US)

( * ) Notice: Subject to any disclaimer, the term of this patent is extended or adjusted under 35 U.S.C. 154(b) by 503 days.

(21) Appl. No.: 09/693,114

(22) Filed: Oct. 20, 2000

Related U.S. Application Data

(63) Continuation-in-part of application No. 09/328,888, filed on Jun. 9, 1999.

(51) Int. Cl.[7] .............................. G06F 17/00; G06N 5/00
(52) U.S. Cl. .............................. 706/45; 706/12; 706/46
(58) Field of Search .............................. 706/45, 12, 46

(56) References Cited

U.S. PATENT DOCUMENTS

| | | | |
|---|---|---|---|
| 4,839,853 A | | 6/1989 | Deerwester et al. |
| 5,021,976 A | | 6/1991 | Wexelblat et al. |
| 5,295,243 A | | 3/1994 | Robertson et al. |
| 5,301,109 A | * | 4/1994 | Landauer et al. .............. 704/9 |
| 5,317,507 A | | 5/1994 | Gallant |
| 5,325,298 A | | 6/1994 | Gallant |
| 5,506,937 A | | 4/1996 | Ford et al. |
| 5,542,006 A | | 7/1996 | Shustorovich et al. |
| 5,542,090 A | | 7/1996 | Henderson et al. |
| 5,625,767 A | | 4/1997 | Bartell et al. |
| 5,675,710 A | | 10/1997 | Lewis |
| 5,675,819 A | | 10/1997 | Schuetze |
| 5,687,364 A | | 11/1997 | Saund et al. |
| 5,704,005 A | | 12/1997 | Iwamida |
| 5,737,488 A | | 4/1998 | Iso |
| 5,761,685 A | | 6/1998 | Hutson |
| 5,794,178 A | | 8/1998 | Caid et al. |
| 5,805,742 A | | 9/1998 | Whitsitt |
| 5,819,258 A | | 10/1998 | Vaithyanathan et al. |
| 5,857,179 A | | 1/1999 | Vaithyanathan et al. |
| 5,987,446 A | * | 11/1999 | Corey et al. .................. 707/3 |
| 6,014,633 A | | 1/2000 | DeBusk et al. |

(List continued on next page.)

OTHER PUBLICATIONS

G. Salton, A. Wong and C.S. Yang, *A Vector Space Model For Automatic Indexing*, Communications of the ACM, Nov. 1975, pp. 613–620, vol. 18, No. 11.

(List continued on next page.)

*Primary Examiner*—Wilbert L. Starks, Jr.
*Assistant Examiner*—Joseph P Hirl
(74) *Attorney, Agent, or Firm*—Alston & Bird LLP

(57) ABSTRACT

Methods, apparatus and computer program products are provided for retrieving information from a text data collection and for classifying a document into none, one or more of a plurality of predefined classes. In each aspect, a representation of at least a portion of the original matrix is projected into a lower dimensional subspace and those portions of the subspace representation that relate to the term(s) of the query are weighted following the projection into the lower dimensional subspace. In order to retrieve the documents that are most relevant with respect to a query, the documents are then scored with documents having better scores being of generally greater relevance. Alternatively, in order to classify a document, the relationship of the document to the classes of documents is scored with the document then being classified in those classes, if any, that have the best scores.

47 Claims, 11 Drawing Sheets

U.S. PATENT DOCUMENTS

| | | | |
|---|---|---|---|
| 6,122,628 | A | 9/2000 | Castelli et al. |
| 6,134,541 | A | 10/2000 | Castelli et al. |
| 6,178,261 | B1 | 1/2001 | Williams et al. |
| 6,189,002 | B1 | 2/2001 | Roiblat |
| 6,307,965 | B1 | 10/2001 | Aggarwal et al. |
| 6,349,309 | B1 | 2/2002 | Aggarwal et al. |
| 6,356,864 | B1 * | 3/2002 | Foltz et al. .................... 704/1 |
| 6,466,685 | B1 | 10/2002 | Fukui et al. |
| 6,611,825 | B1 * | 8/2003 | Billheimer et al. ........... 706/45 |
| 2002/0032682 | A1 | 3/2002 | Kobayaski et al. |
| 2002/0122593 | A1 | 9/2002 | Kato et al. |

OTHER PUBLICATIONS

Leo Breiman, Jerome H. Friedman, Richard A. Olshen and Charles J. Stone, Excerpt from *Classification and Regression Trees*, Wadsorth International Group, 1984, pp. 1–17.

Gerard Salton and Christopher Buckley, *Term–Weighting Approaches In Automatic Text Retrieval, Information Processing & Management*, 1988, pp. 513–523, vol. 24, No. 5.

Scott Deerwester, Susan T. Dumala, George W. Furnas, Thomas K. Landauer and Richard Harshman, *Indexing By Latent Semantic Analysis, Journal of the American Society for Information Science*, Sep. 1990, pp. 391–407, vol. 41, No. 6.

Excerpt from *Proceedings Sixth Message Understanding Conference (MUC–6)*, Nov. 6–8, 1995, pp. 1–11, Columbia, Maryland.

Tom M. Mitchell, Excerpt from *Machine Learning*, 1997, WCB/McGraw–Hill.

Tamara G. Kolda and Dianne P. O'Leary, *A Semidiscrete Matrix Decomposition For Latent Semantic Indexing In Information Retrieval, ACM Transactions on Information Systems*, Oct. 1998, pp. 322–346, vol. 16, No. 4.

M.E. Maron and J.L. Kuhns, *On Relevance, Probabilistic Indexing And Information Retrieval, Journal of the Association for Computing Machinery*, 1960, pp. 216–244, vol. 7, No. 3.

* cited by examiner

METHODS, APPARATUS AND COMPUTER PROGRAM PRODUCTS FOR INFORMATION RETRIEVAL AND DOCUMENT CLASSIFICATION UTILIZING A MULTIDIMENSIONAL SUBSPACE

CROSS-REFERENCE TO RELATED APPLICATIONS

The present application is a continuation-in-part of U.S. Pat. No. 6,611,825 (application Ser. No. 09/328,888) entitled METHOD AND SYSTEM FOR TEXT MINING USING MULTIDIMENSIONAL SUBSPACES filed Jun. 9, 1999 by D. Dean Billheimer et al. (hereinafter "the '888 application"). The contents of the '888 application are hereby incorporated by reference in its entirety.

FIELD OF THE INVENTION

The present invention relates generally to text mining and, more particularly, to retrieving information and classifying documents in an efficient and effective manner by utilizing multidimensional subspaces to represent semantic relationships that exist in a set of documents.

BACKGROUND OF THE INVENTION

Text mining is an extension of the general notion of data mining in the area of free or semi-structured text. Data mining broadly seeks to expose patterns and trends in data, and most data mining techniques are sophisticated methods for analyzing relationships among highly formatted data, i.e., numerical data or data with a relatively small fixed number of possible values. However, much of the knowledge associated with an enterprise consists of textually-expressed information, including free text fields in databases, reports and other documents generated in the company, memos, e-mail, Web sites, and external news articles used by managers, market analysts, and researchers. This data is inaccessible to traditional data mining techniques, because these techniques cannot handle the unstructured or semistructured nature of free text. Similarly, the analysis task is beyond the capabilities of traditional document management systems and databases. Text mining is therefore a developing field devoted to helping knowledge workers find relationships between individual unstructured or semi-structured text documents and semantic patterns across large collections of such documents.

Research in text mining has its roots in information retrieval. Initial information retrieval work began around 1960, when researchers started to systematically explore methods to match user' queries to documents in a database. However, recent advances in computer storage capacity and processing power coupled with massive increases in the amount of text available on-line have resulted in a new emphasis on applying techniques learned from information retrieval to a wider range of text mining problems. Concurrently, text mining has grown from its origins in simple information retrieval systems to encompass additional operations including: information visualization; document classification and clustering; routing and filtering; document summarization; and document cross-referencing. All of the text mining operations listed above share the common need to automatically assess and characterize the similarity between two or more pieces of text. This need is most obvious in information retrieval.

All information retrieval methods depend upon the twin concepts of document and term. A document refers to any body of free or semi-structured text that a user is interested in getting information about in his or her text mining application. This text can be the entire content of a physical or electronic document, an abstract, a paragraph, or even a title. "Document" also encompasses text generated from images and graphics or text recovered from audio and video objects. Ideally, a document describes a coherent topic. All documents are represented as collections of terms, and individual terms can appear in multiple documents. Typically, a term is a single word that is used in the text. However, a term can also refer to several words that are commonly used together, for example, "landing gear." In addition, the terms that represent a piece of text may not appear explicitly in the text; a document's terms may be obtained by applying acronym and abbreviation expansion, word stemming, spelling normalization, thesaurus-based substitutions, or many other techniques. Obtaining the best set of terms for a given document is dependent upon the document or the collection to which the document belongs and the particular goal of the text mining activity.

Once a suitable set of documents and terms has been defined for a text collection, various information retrieval techniques can be applied to the collection. These techniques can be grouped into four broad categories: keyword search methods, natural language understanding methods, probabilistic methods, and vector space methods. Each category as well as its relative advantages and disadvantages is discussed in the '888 application and reference is made to the '888 application for further information.

With respect to traditional vector space methods, individual documents are treated as vectors in a high-dimensional vector space in which each dimension corresponds to some feature of a document. A collection of documents can therefore be represented by a two-dimensional matrix $D_{(t,d)}$ of features and documents. In the typical case, the features correspond to document terms, and the value of each term is the frequency of that term in the specified document. For example, if term $t_1$ occurs four times in document $d_1$, then $D_{(1,1)}$ is set to 4. Similarly, if term $t_2$ does not occur in $d_1$, then $D_{(2,1)}$ is set to 0. More complex types of vector space methods, such as latent semantic indexing (LSI), involve ways of transforming D, e.g. singular value decomposition (SVD) or semi-discrete decomposition (SDD), which typically attempt to provide a more sophisticated set of features and a better measure of the importance of each feature in a document.

By representing documents as vectors in a feature space, similarity between documents can be evaluated by computing the distance between the vectors representing the documents. A cosine measure is commonly used for this purpose, but other distance measures can be used. To use the vector space method for information retrieval, a user's query is treated as a pseudo-document and is represented as a vector in the same space as the document vectors. The distance between the query vector and each of the document vectors is computed, and the documents that are closest to the query are retrieved.

The advantages of the vector space method are that it provides a simple and uniform representation of documents and queries, can accommodate many variations appropriate to different document collections, and has been shown to perform relatively well in information retrieval applications. In addition, representing documents as vectors could be useful for all other text mining operations. However, the performance of the basic vector space method is severely limited by the size of D. In actual document collections, both the number of documents and the number of terms are typically quite large, resulting in a large D, and making the necessary distance calculations prohibitively slow. It is possible to alleviate this problem by preselecting a subset of all possible terms to use in the matrix, but this can degrade information retrieval performance and limit text mining capability. Finally, while the traditional vector space method provides a way of assessing the similarities between pieces of text, it alone does not provide a good way to visualize these relationships or summarize documents.

As described by the '888 application, an improved vector space method has been developed that allows the user to efficiently perform a variety of text mining operations including information retrieval, term and document visualization, term and document clustering, term and document classification, summarization of individual documents in groups of documents, and document cross-referencing. In this technique, the document collection is represented using a subspace transformation based on the distribution of the occurrence of terms in the documents of the document collection. In particular, a term-by-document frequency matrix D is initially constructed that catalogs the frequencies of the various terms for each of the documents. The term-by-document matrix can then be preprocessed to define a working matrix A by normalizing the columns of the term-by-document matrix D to have a unit sum, stabilizing the variance of the term frequencies via a nonlinear function and then centering the term frequencies with respect to the mean vector of the columns. This preprocessing is denoted as $A=f(D)-ce^T$ in which c is the mean of the columns of $f(D)$ and e is a d-vector whose components are all 1, so that the average of the columns of A is now 0. Each $ij^{th}$ entry in A is therefore a score indicating the relative occurrence of the $i^{th}$ term in the $j^{th}$ document. Traditionally, $f$ is defined as a two-sided weighting function, i.e., $$f(D)=(W_tD)W_d$$

wherein $W_t$ and $W_d$ are two diagonal scaling matrices for weighing terms and documents, respectively, as known to those skilled in the art.

To capture some of the semantics latent in the documents, i.e., to capture similarity of content despite variations in word usage such as the use of synonyms, the working matrix A is orthogonally decomposed to obtain a rank-k matrix $A_k$ that approximates A. In this regard, the orthogonal decomposition of the working matrix A can be performed with a number of decompositional techniques, such as a two-sided orthogonal decomposition.

By way of example, one typical two-sided orthogonal decomposition is a truncated URV (TURV) decomposition. For a given dimension k, the TURV computes bases of subspaces with high information content (matrices $U_k$ and $V_k$ with orthonormal columns) satisfying the equation:

$$AV_k=U_kR_k,$$

wherein $R_k$ is a triangular matrix of order k. Then an approximate term-document matrix $A_k$ is defined as:

$$A_k=U_kR_kV_k^T$$

For the approximation $A_k$, as well as for A, each row corresponds to a term and each column corresponds to a document. The $ij^{th}$ entry of $A_k$ therefore provides a relative occurrence of the $i^{th}$ term in the $j^{th}$ document, but this relative occurrence has now been filtered by the approximation which captures semantics latent in the documents. More specifically, the factor $U_k$ captures variations in vocabulary, while the factor $V_k^T$ brings out latent structure in the corpus of documents.

Following the orthogonal decomposition designed to capture some of the semantics latent in the documents, the matrix $A_k$ can be searched to identify the documents that are most relevant to a particular query. In traditional vector space as well as latent semantic indexing approaches, the query is treated as a pseudo-document and may be represented as a vector q of length t. Each component of the query vector q records the occurrence of the corresponding term in the query. While the query can be much like another document and have numerous terms, the query oftentimes contains just a few term, called keywords. Regardless of its size, the query is then compared to the term-document matrix $A_k$ in order to identify occurrences of the terms included within the query following the capture of some of the semantics latent in the document.

In this comparison process, each of the d documents (each column of $A_k$) is compared to the given query, or rather its projection into $A_k$, and a score is assigned based on this comparison. According to one conventional technique, a 1×d score vector s is calculated as follows:

$$s=\delta(P_t(f(q)-c),A_k),$$

wherein $\delta$ is a measurement function applied to $P_t(f(q)-c)$ and each column of $A_k$, and wherein $P_t$ is the projection matrix for the k-dimensional subspace $R(U_k)$ and is defined as $P_t=U_kU_k^T$. Traditionally, $\delta$ could be the inner product, the cosine, or the Euclidean distance of the vectors. The documents having the best scores can then be returned as the documents most relevant to the particular query. It can be shown that for the inner product and Euclidean distance, two traditional choices for $\delta$, the projection $P_t$ will not alter the sorting result. For example, since $p_t^T=P_t$ and $P_tA_k=A_k$, the score resulting from inner product is not changed if $P_t$ is removed from the determination of the score vector. Therefore, it is more common to define the score-vector as:

$$s=\delta(f(q)-c,A_k)$$

The components of the score vector determine the relative performance of the documents against the query. Selecting which documents to return to a user can be accomplished in a variety of methods, typically by returning the best scoring documents. The best scoring documents could be identified, for example, by applying a threshold to the individual scores, by taking a fixed number in ranked order, or by statistical or clustering techniques applied to the vectors of the scores.

Treating each query as a pseudo-document is certainly a viable technique and provides valuable information in many instances, particularly in instances in which the query is an actual document and the user wishes to identify other documents like it. By treating each query as a pseudo-document, however, the above-described scoring technique may suffer from several difficulties in certain circumstances. In this regard, a query vector having just a few terms contains only a few non-zero components. As such, the measurement function $\delta$ may be corrupted by entries in the term-document matrix $A_k$ that are not of interest or are irrelevant with respect to the query, i.e., entries in the rows of $A_k$ that correspond to terms of the query that have a zero component. In this regard, terms of a query that have a zero component should be treated as being irrelevant for purposes of the comparison, that is, documents having the terms of the query that have a non-zero component should receive a relatively good score regardless of whether or not the documents include the terms that have zero components in the query. However, by treating queries as pseudo-documents, the absence of certain terms is interpreted to mean, not that it is irrelevant as to whether the terms are present or not, but that the terms should occur at a below average frequency since both the original set of documents and the query have been centered with respect to the mean vector of the respective columns, thereby transforming entries that were originally zero to some other fractional value.

Moreover, the scores that are determined as described above may also be misleading if a document makes disproportionate use of the various terms that comprise a query. A typical query contains few terms and each typically occurs only once and when this is treated as a pseudo-document the documents containing these terms in roughly equal proportions will be more likely to be returned than documents that contain all of the terms, possibly in substantial numbers, but in unequal proportion.

Finally, documents that include one or more high frequency terms may receive a misleadingly good score even though those documents include very few, if any, of the other terms of the query; which are of equal importance in determining the relevance of the documents than the high frequency terms.

It would therefore be desirable to weight the various terms included within the search query. As such, the preprocessing function $f$ typically includes a term weighting factor $W_t$ to reduce the impact of high-frequency terms and the disproportionate use of the terms. This type of term weighting is a type of global weighting since it is calculated based on the entire document set. Since traditional term weighting is calculated based on the entire document set, the addition of new documents or the removal of old documents from the document collection requires the term weighting factor to again be determined for all of the documents, including those that remain from the prior collection. As will be apparent, this recomputation of the term weighting factor can be relatively time consuming and processing intensive in situations involving a large collection of documents. Additionally, by globally applying a term weighting factor, the actual importance of certain terms in a document is changed such that the resulting subspace representation $A_k$ will not be suitable for some applications, such as the assignment of topic words, i.e., words automatically generated to summarize a document or a group of documents.

As such, it would be desirable to search a collection of documents in order to retrieve information or classify new documents in a reliable fashion that is not corrupted by scores based in part upon terms that are irrelevant with respect to the query. Additionally, it would be desirable to individually weight the terms of a query so as to appropriately consider each term without requiring extensive recomputation of the weighting factors as the document collection is updated.

SUMMARY OF THE INVENTION

The present invention therefore provides improved methods, apparatus and computer program products for retrieving information from a text data collection and for classifying a document into none, one or more of a plurality of predefined classes. In each aspect of the invention, a representation of at least a portion of the original matrix is projected into a lower dimensional subspace and those portions of the subspace representation that relate to the term(s) of the query are weighted following the projection into the lower dimensional subspace. Thus, a plurality of documents can be scored or a new document can be classified in a reliable fashion since high-frequency terms and the disproportionate use of terms will not unnecessarily skew the results and since terms that are irrelevant with respect to the query are not considered. In addition, updating of the text data collection is simplified since the weights are determined following the projection of the original matrix into the lower dimensional subspace, thereby avoiding the difficulty of having to recompute each row-scaling factor in every instance in which a new document is added or an existing document is removed from the text data collection.

According to one aspect of the present invention, a method, apparatus and computer program product are provided to retrieve information from a text data collection that comprises a plurality of documents with each document consisting of a number of terms. The text data collection is represented by a term-by-document matrix having a plurality of entries with each entry representing the frequency of occurrence of a term in a respective document. According to this aspect of the present invention, an orthogonal basis for a lower dimensional subspace is generally obtained from the term-by-document matrix as a part of document indexing. A query is received that typically identifies at least one term. A representation of at least a portion of the term-by-document matrix is then projected into the lower dimensional subspace to create at least those portions of the subspace representation $A_k$ relating to the term(s) identified by the query. At least those portions of the subspace representation $A_k$ relating to the term(s) identified by the query are then weighted following the projection into the lower dimensional subspace. The plurality of documents are then scored with respect to the query based at least partially upon the weighted portion of the subspace representation $A_k$. Documents, such as the most relevant documents, can then be identified based upon ranking the scores of the documents with respect to the query.

The method, apparatus and computer program product of this aspect of the present invention also permit queries to be treated as either a pseudo-document or as a set of terms, with the subsequent processing and scoring of the query differing depending upon its treatment. As such, a determination is initially made to treat the query as either a pseudo-document or a set of terms depending at least partially upon the number of terms included within the query. If the query is to be treated as a set of terms, the query is processed and scored as described above. Alternatively, if the query is to be treated as a pseudo-document, a representation of at least a portion of the term-by-document matrix and a query vector representative of the query are both projected into the lower dimensional space and the corresponding projections are compared with the scoring of the plurality of documents being based at least partially upon this comparison.

According to another aspect of the present invention, a method, apparatus and computer program product are provided for classifying a document into none, one or more of a plurality of predefined classes defined by a term-by-class matrix with each predefined class including at least one term. According to this aspect of the present invention, there is a training sample of documents, each assigned to zero, one or more classes. A term-by-class matrix is formed from this training set having a plurality of entries with each entry representing the frequency of occurrence of a term in all the documents assigned to a class. An orthogonal basis for a subspace is obtained from the term-by-class matrix as a part of the classifier training phase. A representation of the document to be classified is received that consists of a collection of terms. A representation of at least a portion of the term-by-class matrix is then projected into a lower dimensional subspace, such as by means of an orthonormal decomposition, to thereby create at least those portions of the subspace representation $A_k$ relating to term(s) included within the representation of the document to be classified. At least those portions of the subspace representation $A_k$ relating to the term(s) included within the representation of the document to be classified are then weighted following the projection into the lower dimensional subspace. The relationship of the document to each predefined class is then scored based at least partially upon the weighted portion of the subspace representation $A_k$. Depending upon the scores of the relationship of the document to each predefined class, the document may be classified into none, one or more of the plurality of the predefined classes.

According to either aspect of the present invention, the weighting of at least those portions of the subspace representation $A_k$ relating to at least one term can be performed in a variety of fashions. In this regard, the subspace representation $A_k$ includes a plurality of rows corresponding to respective terms. In one embodiment, each term is weighted by determining an inverse infinity norm of the term, i.e., the inverse of the maximum of the absolute values of the entries in the row of the subspace representation $A_k$ corresponding to the term. In another embodiment, each term is weighted by determining an inverse one-norm of the term, i.e., the inverse of the sum of the absolute values of the entries of the row of the subspace representation $A_k$ corresponding to the term. In yet another embodiment, each term is weighted by determining an inverse 2-norm of the term, i.e., the inverse of the square root of the sum of the squares of the entries in the row of the subspace representation $A_k$ corresponding to the term.

Accordingly, the methods, apparatus and computer program products of the present invention provide improved techniques for retrieving information from a text data collection and for classifying a document into none, one or more of a plurality of predefined classes. By weighting the term(s) of the query when treated as a set of terms, or the term(s) of the document to be classified following the projection into the lower dimensional subspace, a plurality of documents can be scored or a new document can be classified in a reliable fashion since high-frequency terms and the disproportionate occurrence of terms in documents will not unnecessarily skew the results and since terms that are irrelevant with respect to the query are not considered. In addition, updating of the text data collection is simplified since the weights are determined following the projection of the original matrix into the lower dimensional subspace, thereby avoiding the difficulty of having to recompute each row-scaling factor in every instance in which a new document is added or an existing document is removed from the text data collection.

BRIEF DESCRIPTION OF THE DRAWINGS

Figure 1:
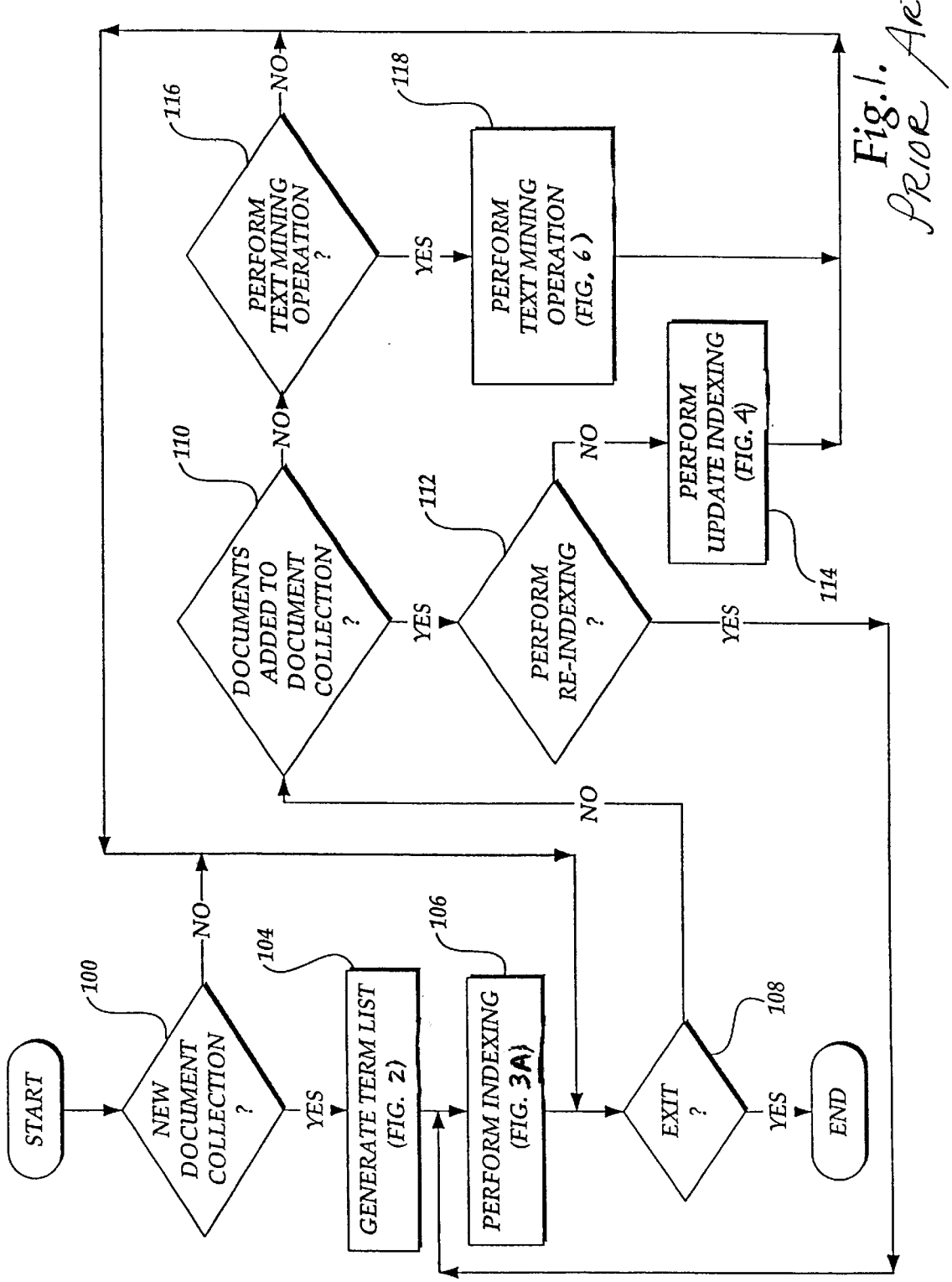
Figure 2:
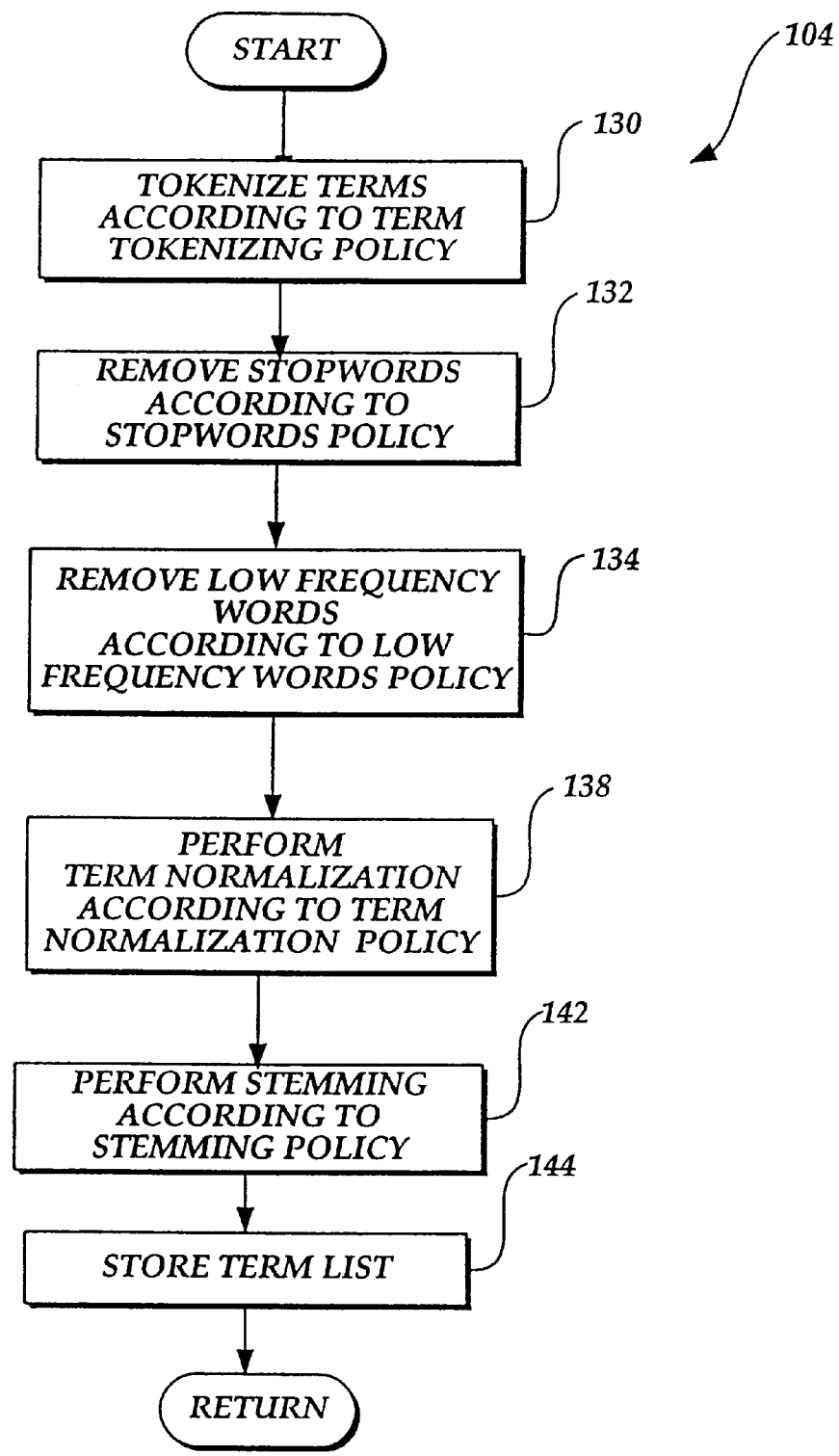
Figure 3A:
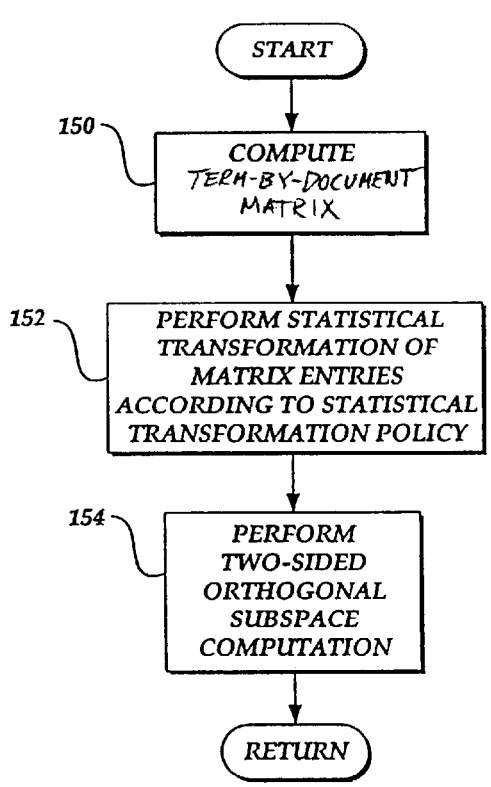
Figure 3B:
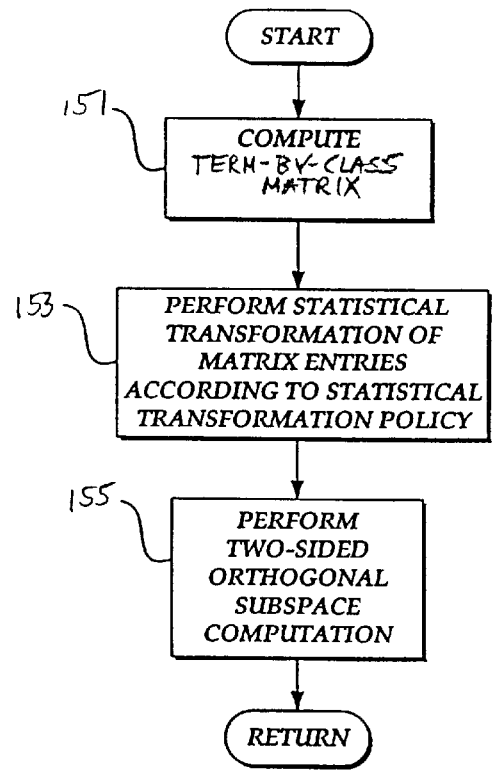
Figure 4:
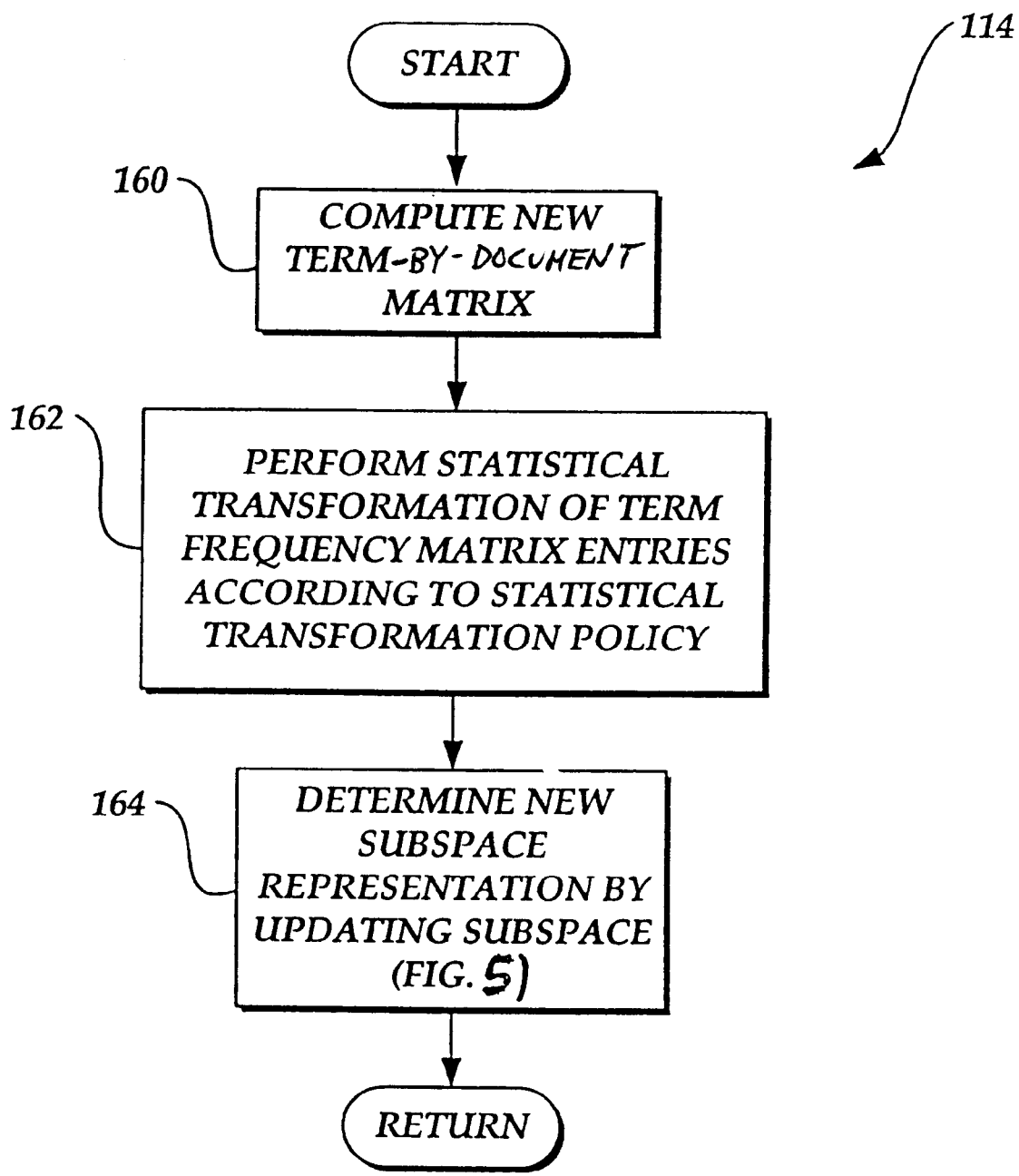
Figure 5:
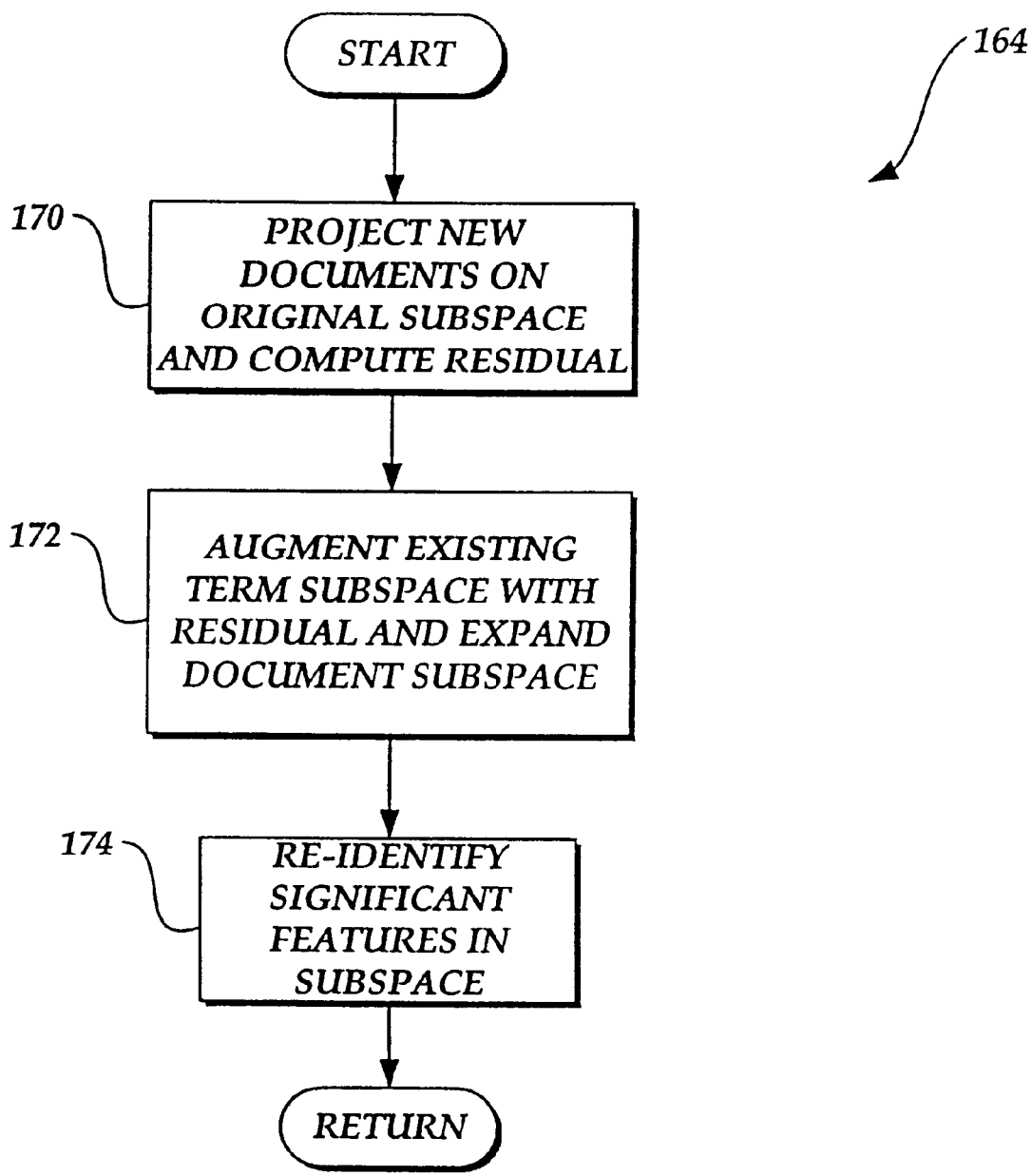
Figure 6:
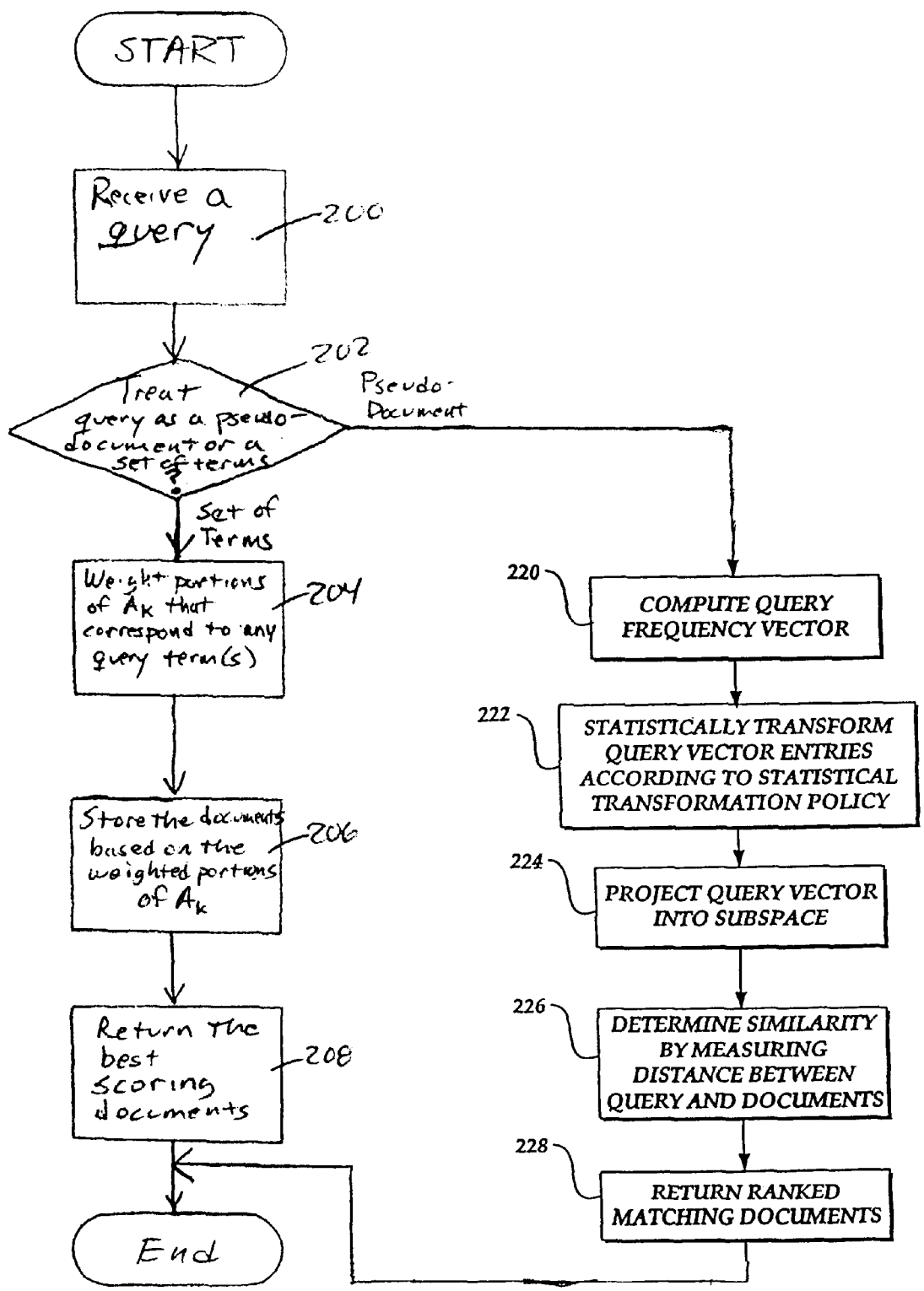
Figure 7:
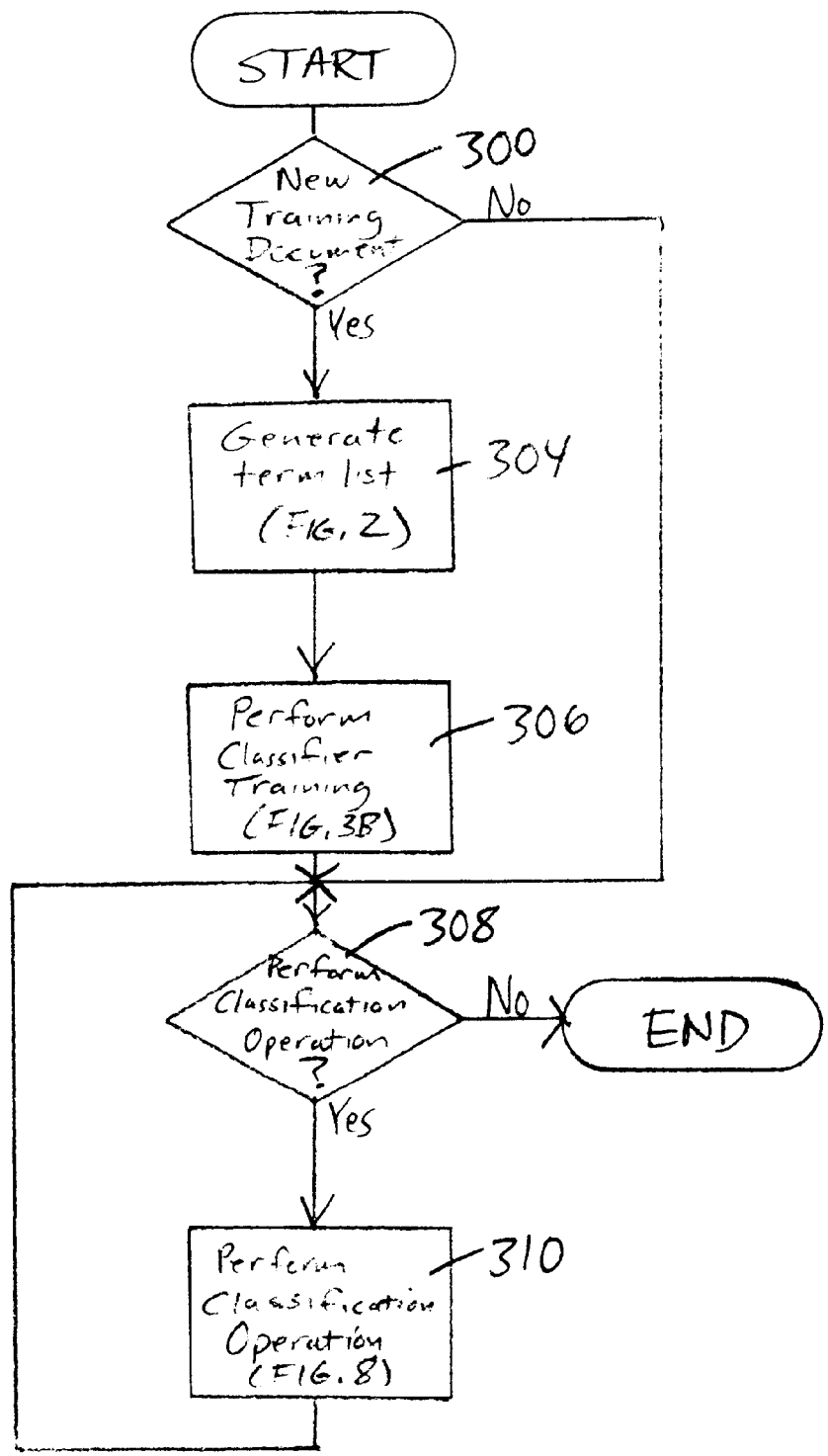
Figure 8:
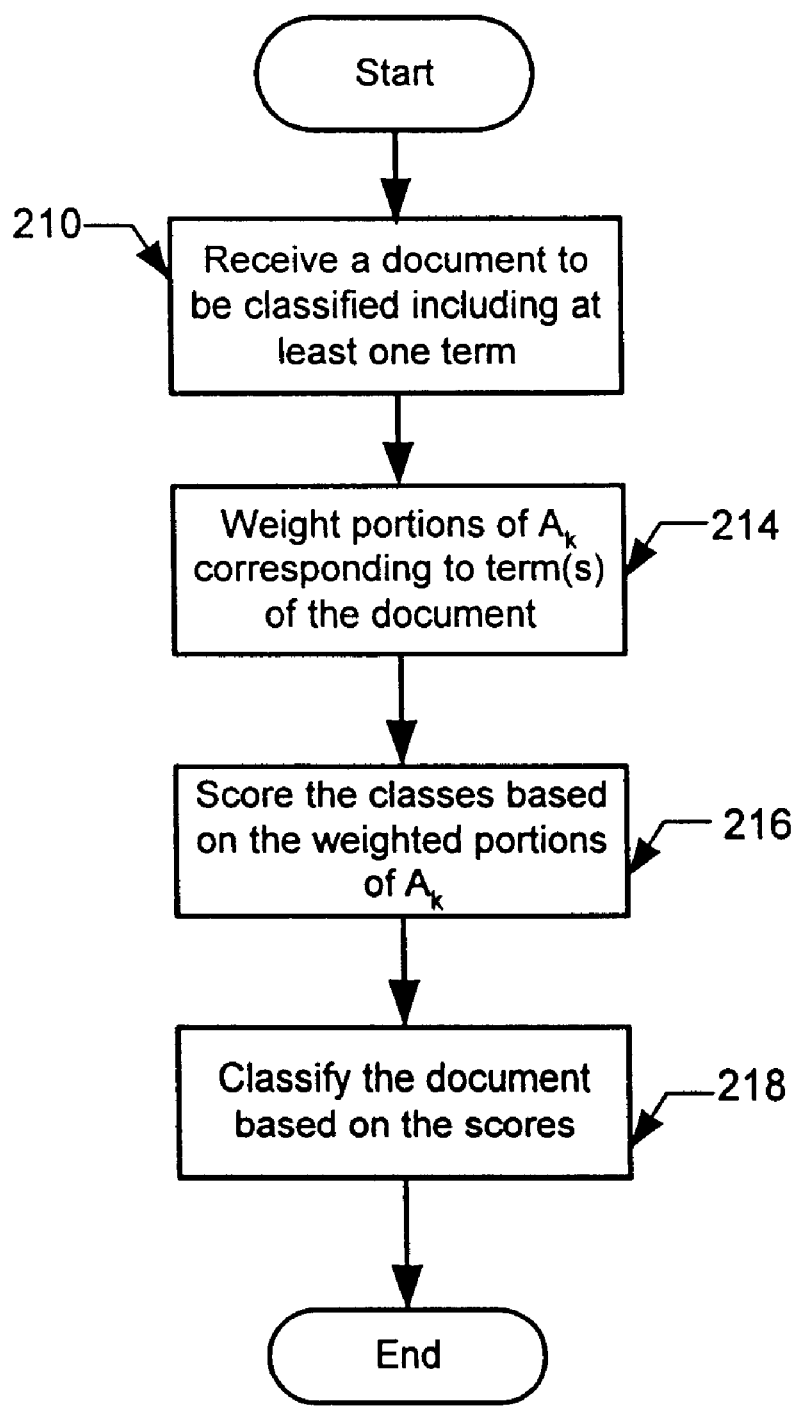
Figure 9A:
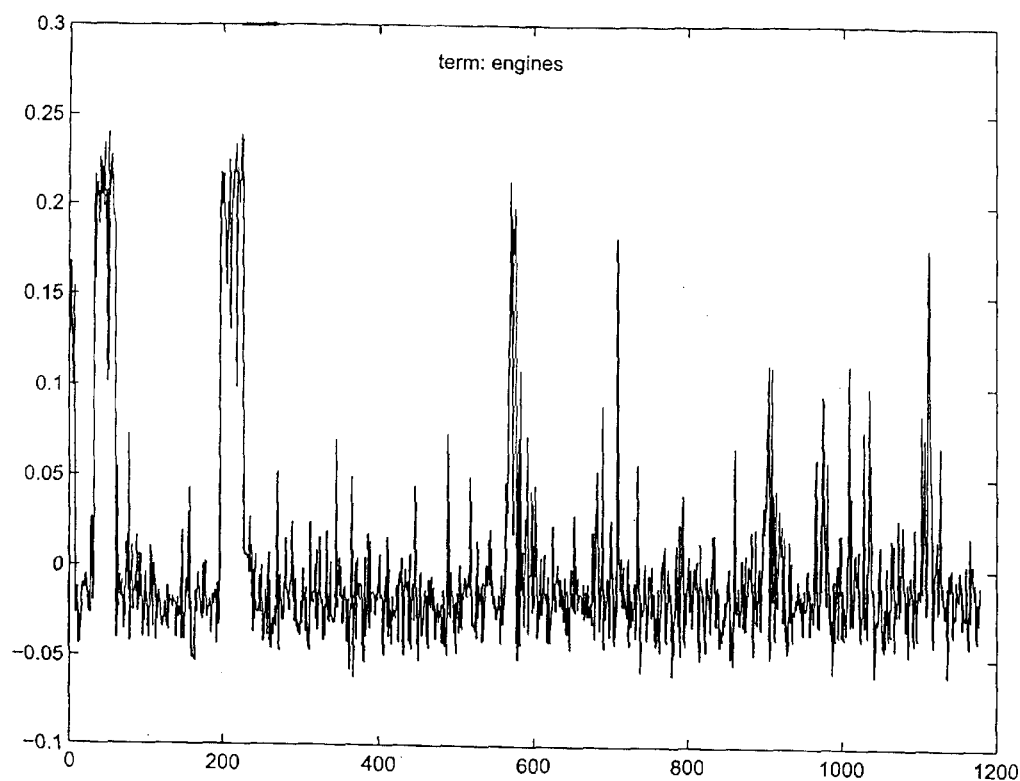
Figure 9B:
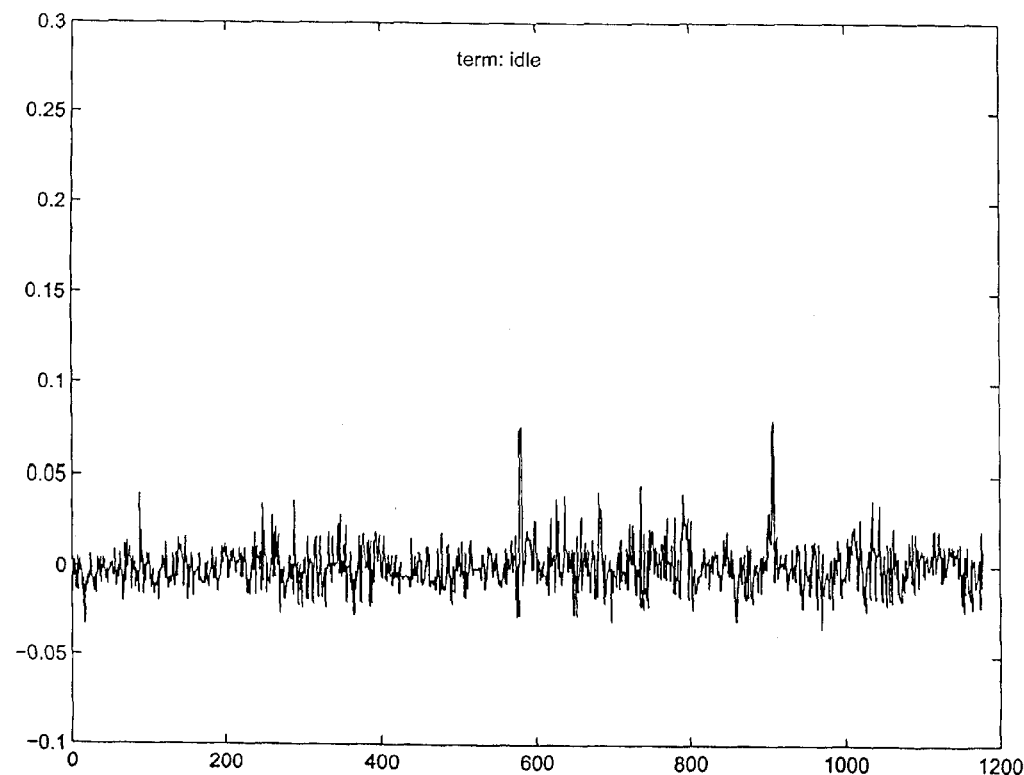

Having thus described the invention in general terms, reference will now be made to the accompanying drawings wherein:

FIG. 1 is a flow diagram illustrating the overall logic of a text mining program formed in accordance with the present invention;

FIG. 2 is a flow diagram illustrating logic for generating a term list;

FIG. 3A is a flow diagram illustrating logic for performing indexing that provides a representation of the documents for text mining operations;

FIG. 3B is a flow diagram illustrating logic for performing classifier training;

FIG. 4 is a flow diagram illustrating logic for performing update indexing;

FIG. 5 is a flow diagram for determining a new subspace representation by updating an existing subspace with new documents and terms;

FIG. 6 is a flow diagram illustrating the logic of performing information retrieval operations;

FIG. 7 is a flow diagram illustrating the overall logic associated with a document classification operation in accordance with the present invention;

FIG. 8 is a more specific flow diagram illustrating the logic of performing a document classification operation;

FIGS. 9A and 9B graphically illustrate the entries in a subspace representation $A_k$ of an exemplary collection of documents for the terms engines and idle, respectively.

Figure 10A:
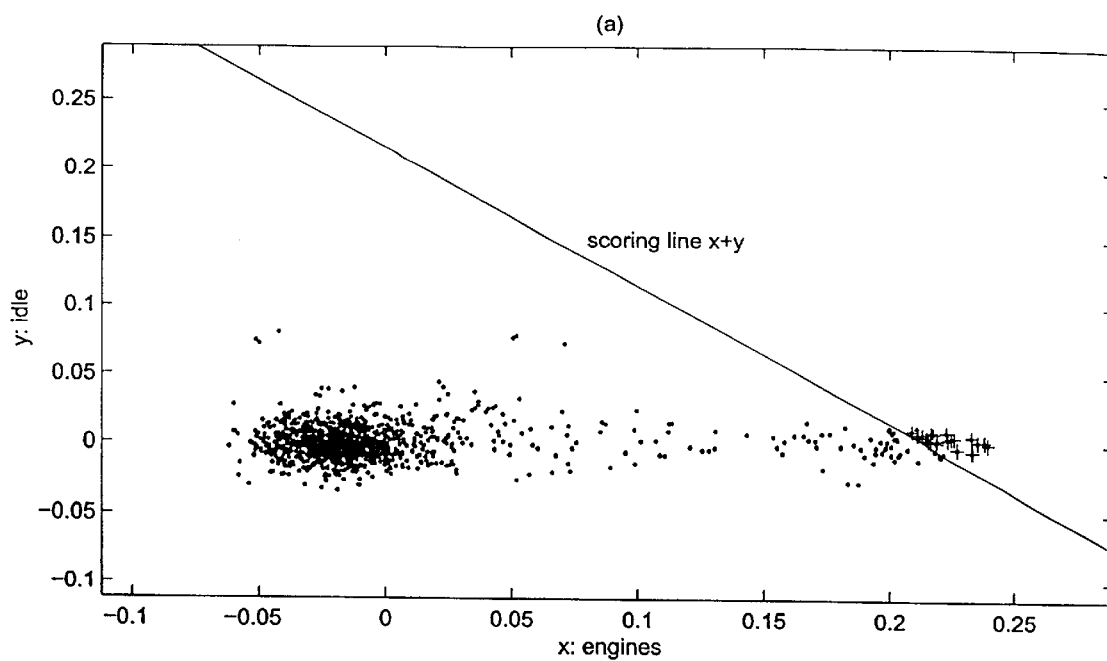
Figure 10B:
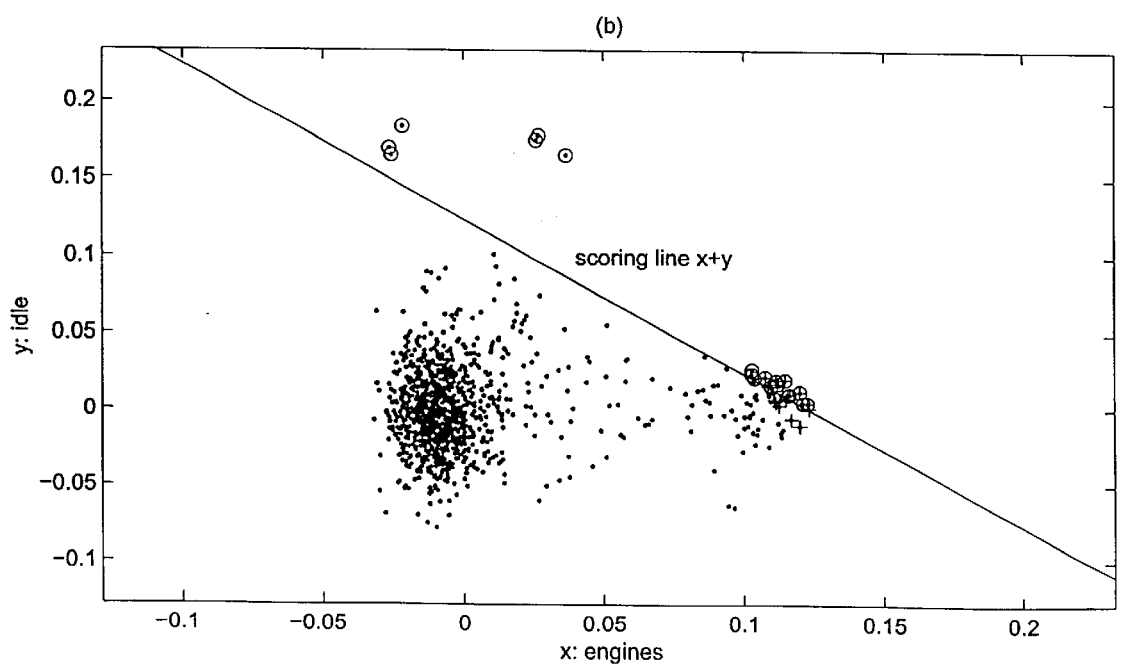

FIGS. 10A and 10B are graphical illustrations of the sorting of the documents utilizing unweighted and weighted techniques, respectively.

Figure 11:
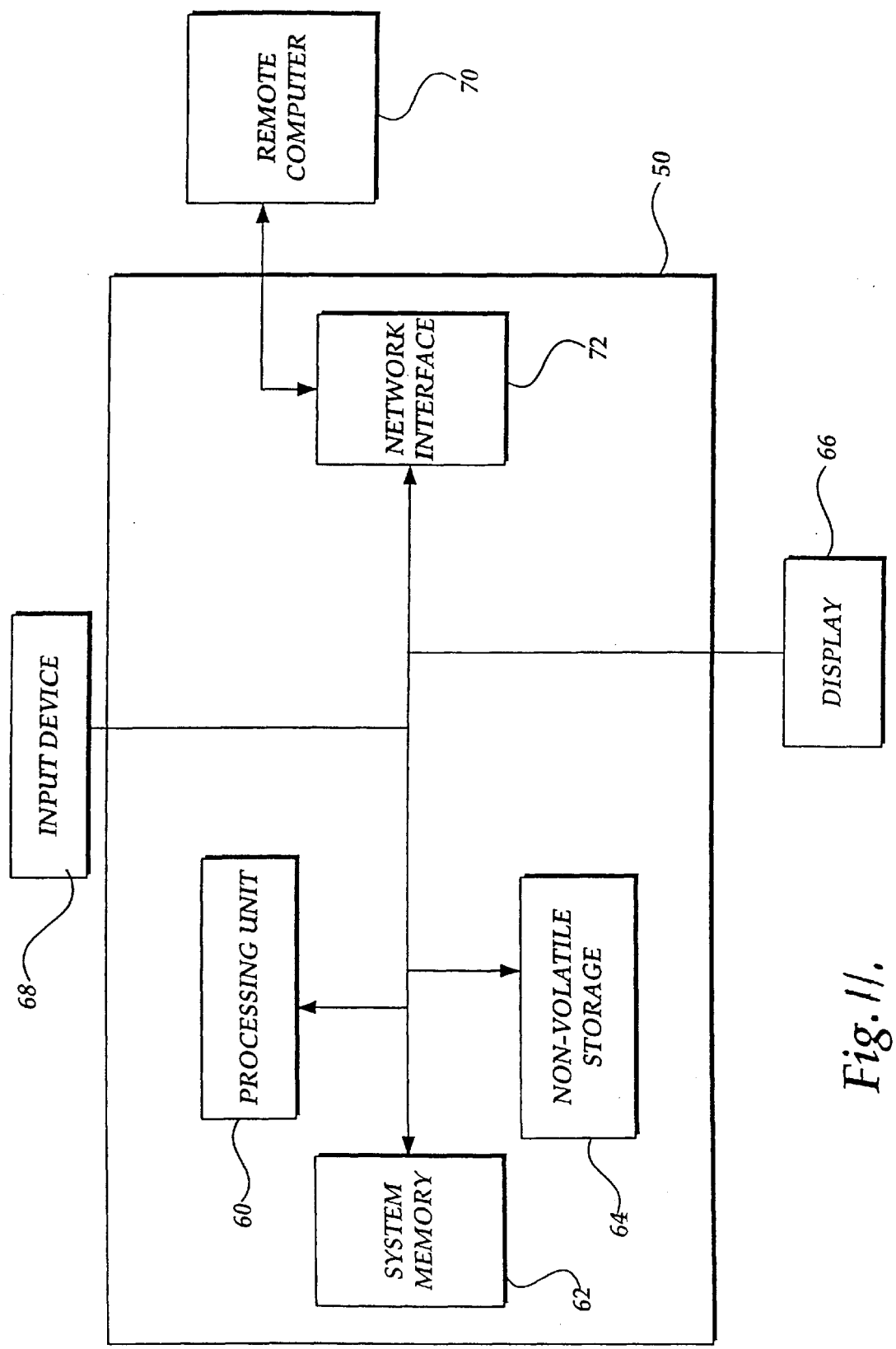

FIG. 11 is a block diagram of a general purpose computer system suitable for implementing the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The methods, apparatus and computer program products of the present invention perform text mining operations and, more particularly, information retrieval and document classification operations. In performing these operations, the methods, apparatus and computer program products of the present invention utilize a multidimensional subspace to represent semantic relationships that exist in a set of documents in order to obtain more meaningful results. Accordingly, the methods, apparatus and computer program products of the present invention are capable of processing a large data set in a reasonably fast processing time without requiring prior knowledge of the data.

FIGS. 1–6 are flow diagrams illustrating the logic of performing information retrieval operations on a text document collection according to one aspect of the present invention. As described hereinafter, the logic of performing document classification is similar in many respects to the logic of performing information retrieval and is depicted in FIGS. 7 and 8. As such, the method, apparatus and computer program product of the present invention will be initially described in conjunction with information retrieval operations. As explained hereinafter, the logic associated with both information retrieval and document classification treat queries as either a pseudo-document as described above in conjunction with conventional techniques or in a unique manner as a set of terms or keywords. By permitting queries to be treated as either pseudo-documents or sets of keywords, the information retrieval and document classification can performed according in a manner that will be most efficient and effective for the particular query.

FIG. 1 is a flow diagram illustrating the overall logic of the present invention relating to information retrieval operations. The logic moves from a start block to decision block 100 where a test is made to determine if the document collection of interest is new. If so, the logic moves to block 104 where a term list is generated from the initial document collection. Generating a term list from the initial document collection is illustrated in detail FIG. 2, and is described later. Next, in block 106, initial indexing is performed, as illustrated in detail in FIG. 3A and described later. In basic terms, however, indexing involves the creation of the subspace representation $A_k$ from the document collection. After initial indexing is performed, or if the document collection is not new, the logic moves to decision block 108 where a test is made to determine if the program should exit. If so, the logic of the present invention ends. If the program should not exit, the logic moves from decision block 108 to decision block 110 where a test is made to determine if documents have been added to the collection. If so, the logic moves to decision block 112 where a test is made to determine if re-indexing should be performed. Update indexing modifies the subspace to approximate the effects of the new documents. Over time, the approximation of update indexing will gradually lose accuracy, and re-indexing should be performed to re-establish the latent semantic structure of the modified document collection. Preferably, the determination of when to perform re-indexing is made by a user. Preferably the user has been provided with data that allows him or her to estimate the growing error in approximation. The user can then perform re-indexing to renew the subspace at a convenient time, such as overnight. If it is determined that re-indexing should be performed, the logic moves from decision block 112 to block 106 where indexing is performed as described later with reference to FIG. 3A. The re-indexing logic is the same as the initial indexing logic. If re-indexing should not be performed, the logic moves to block 114 where update indexing is performed. The logic of performing update indexing is illustrated in detail in FIG. 4 and described later. After performing re-indexing 106 or update indexing 114, the logic moves to decision block 108 to determine if the program should exit.

If in decision block 100 it is determined that there were not any documents added to the document collection, the logic moves to decision block 116 where a test is made to determine if an information retrieval operation should be performed. Preferably, this determination is based on a user request to perform an information retrieval operation. If so, the logic moves to block 118 for performance of a text mining operation, namely, an information retrieval operation as depicted in FIG. 6. After the performance of the information retrieval operation 118, the logic moves to decision block 108 to determine if the program should exit. If so, the logic ends. If no, the logic moves to decision block 110, and the logic of blocks 108 through 118 is repeated until it is time to exit. It will be appreciated by those skilled in the computer arts that the logic performed in FIG. 1 can be performed in a different order. Additionally, some steps can be performed simultaneously.

FIG. 2 illustrates in detail the logic of generating a term list. The logic of FIG. 2 moves from a start block to block 130 where terms are tokenized according to a tokenizing policy, (e.g., sequences of letters, letters and numbers, or letters, numbers and certain punctuation like hyphens or slashes, i.e., whatever is needed to capture the important terms in the particular domain or the application). Next, in block 132, stopwords are removed according to a stopwords policy. Stopwords are either terms that do not contribute significantly to the overall topic of the documents, such as conjunctions, articles, pronouns, prepositions, or terms that are frequency used throughout the document, and thus do not serve to topically distinguish one document from another. The optimal set of stopwords (i.e., the stopwords policy) for a document collection is typically specific to that document collection. Low frequency words, i.e., words occurring relatively few times in the document collection, are removed according to a low frequency words policy. See block 134. The low frequency words policy is based on the document collection. This policy may be not to remove low frequency words, thereby making this an optional step. As many as half of the terms in a typical data collection occur less than five times. Eliminating these low frequency terms from A is an optional step that can greatly increase computational speeds with a minor loss of information in the subspace. The logic then moves to block 138 where term normalization is performed according to a term normalization policy. The term normalization policy is based on the document collection. This policy may be not to perform any term normalization, thereby making this an optional step. Term normalization may include: acronym expansion (e.g., "COTS" is the same as "commercial off-the-shelf"), abbreviation expansion (e.g., "ref." Is the same as "reference" in some document collections), and other term normalization. Other term normalization is specific to the document collection for example, in a document collection pertaining to different commercial aircraft models, it might be desirable to group model numbers together, e.g., "747" and "737." The term normalization can include any combination of term normalization including but not limited to those previously listed. Some of the term normalizations may be performed more than one time. The term normalization policy defines the term normalizations and their order of performance for a given document collection. In block 142, stemming is performed according to a stemming policy. The stemming policy is based on the document collection. This policy may be not to perform stemming, thereby making this an optional step. Stemming eliminates conjugate forms of a word, e.g., "es," ed," and "ing" and keeps only the root word. Care needs to be taken when performing stemming, for example, it would not be desirable to change "graphics" to "graph" or Boeing" to "Boe." Finally, in block 144 the term list is stored. When a document collection changes, and update indexing or re-indexing is performed, the same policies originally used to generate the term list, i.e., the same term tokenizing policy 130, the same stopwords policy 132, the same low frequency words policy 134, the same term normalization policy 138, and the same stemming policy 142, are used to update the term list. The logic of FIG. 2 then ends and processing is returned to FIG. 1.

FIG. 3A is a flow diagram illustrating the logic of performing indexing. Indexing is performed on the initial document collection, as well as when it is determined that re-indexing should occur (see FIG. 1). The logic of FIG. 3A moves from a start block to block 150 where a term-by-document or term frequency matrix is computed. The term-by-document matrix D is defined from a set of d documents that have been derived from a free or semi-structured text collection. Across this document collection, statistics are accumulated on the frequency of occurrence of each term. Each entry A is the raw frequency of the term in the given document, i.e., $A_{i,j}$ is the number of times term $t_i$ occurs in document $_j$. A is typically quite sparse. For example, it is common to find term-by-document matrices with over 98% of the entries being zero.

After the computation of the term-by-document matrix, the logic moves to block 152 where statistical transformations of matrix entries are performed according to a statistical transformation policy. The statistical transformation policy may be not to perform any statistical transformations, thereby making this an optional step. Better results may be achieved through statistical transformation. Exemplary transformations include: (1) adjusting a raw term-by-document by the sum of the term frequencies of the document, thus obtaining a relative frequency of occurrence; (2) applying a transformation to the date (e.g., taking the arcsine of the square root of the relative frequencies) to stabilize the variance of the sampling frequencies, thereby making words with radically different frequencies more comparable; and (3) centering the data around the origin by subtracting the row average from each term-by-document. Obtaining a relative frequency, and stabilizing the variance of the sampling frequencies make the term frequencies more comparable to each other from one document to the other, while centering the data makes the interpretation of the data statistically more meaningful. Obtaining a relative frequency, and stabilizing the variance of the sampling frequencies themselves do not change the sparsity of the matrix. However, centering the data does destroy the sparsity of A and is sometimes avoided for computational reasons.

In one advantageous embodiment, the initial term-by-document matrix D having a plurality of columns, one of which represents each document, and a plurality of rows, one of which represents each term, is preprocessed to form a working matrix A. In this embodiment, the preprocessing includes normalizing the columns of matrix D to have unit sum, stabilizing the variance of term frequencies via a non-linear function, and then centering with respect to the mean vector of the columns. The preprocessing can be mathematically represented by $A=f(D)-ce^T$ in which c is the mean vector and e is a d-vector whose components are all 1 so that the average of the columns of A is now zero. As such, each $ij^{th}$ entry in A is a score indicating the relative occurrence of the $i^{th}$ term in the $j^{th}$ document.

The weighting function $f$ preferably includes a column-scaling factor $W_d$ for weighting the matrix on a document-by-document basis. However, the weighting function $f$ preferably does not include a row-scaling factor $W_t$ so as to facilitate the updating of the working matrix A as documents are added or removed from the text document collection since the row scaling factors do not have to be determined across all of the documents. In one embodiment, for example, the weighting function $f$ is defined as:

$$f(D)-=\sin^{-1}(sqrt(DW_d))$$

Following the statistical transformation of the matrix entries, the matrix A is projected into a lower dimensional subspace. For example, the working matrix A can be projected into a k dimensional subspace, thereby defining the subspace representation $A_k$. While the working matrix A can be projected into the subspace according to a variety of techniques including a variety of orthogonal decompositions, the projection of A into the subspace is typically performed via a two-sided orthogonal matrix decomposition, such as a truncated URV (TURV) decomposition as described by the '888 application in order to expose the latent semantic structure of the document collection. The TURV decomposition provides a means of projecting the data into a much lower dimensional subspace that captures the essential patterns of relatedness among the documents. Statistically, the effect of the TURV is to combine the original large set of variables into a smaller set of more semantically significant features. The coordinates of the projected data in the reduced number of dimensions can be used to characterize the documents, and therefore represent the effect of thousands or tens of thousands of terms in a few hundred or more significant features. As a result of the properties of the TURV, the resultant subspace will capture the latent semantic structure of the original matrix A, removing the differences that accrue from the user's variability in word choice to describe the same ideas, thus enhancing the ability to perceive the semantic patterns in the data. Following the projection of the working matrix A into the k-dimensional subspace, the logic of FIG. 3A returns processing functionality to FIG. 1. As will be described hereinafter, the entire subspace representation $A_k$ need not always be determined. Instead, only those portions, i.e., those rows, of the subspace representation $A_k$ that correspond to the terms included within the query must be determined, thereby conserving processing resources and reducing processing time.

When new documents are added to the document collection, update indexing is performed, as illustrated in FIG. 4. The logic of FIG. 4 moves from a start block to block 160 where a term-by-document matrix for the new documents is computed. Next, in block 162 a statistical transformation of the matrix entries is performed according to the statistical transformation policy (see block 152, FIG. 3A). Still referring to FIG. 4, the logic then moves to block 164 where a new subspace representation is determined by updating the existing subspace with new documents and terms, as illustrated in detail in FIG. 5, and described next. The logic of FIG. 4 then ends and processing is returned to FIG. 1.

The logic of FIG. 5 determines a new subspace representation by updating the existing subspace with new documents and terms by initially moving from a start block to block 170 where new documents are projected on the original subspace and the residual is computed. Next, in block 172, the existing term subspace $U_k$ is augmented with the normalized residual, which is orthogonal to the original term subspace, and the document subspace, $V_k$, is expanded by adding a small identity matrix accordingly. See the '888 application for a more detailed description of the term subspace $U_k$ and the document subspace $V_k$. The logic then moves to block 174 where the k most significant features in the subspace are re-identified, again, for example, by rank-revealing techniques. The logic of FIG. 5 then ends and processing returns to FIG. 1.

FIG. 6 illustrates the logic of information retrieval which commences with the receipt of a query as shown in block 200. Typically, the query includes at least one term, although in some instances the query may be devoid of terms since, for example, the query may have been composed of one or more words that do not serve as terms. As depicted in block 202, an initial decision is made as to whether to treat the query as a pseudo-document or as a set of terms and then to process the query differently depending upon its treatment. Thus, the method, apparatus and computer program product of this aspect of the present invention advantageously supports different types of processing of the query depending upon the nature of the query itself, thereby providing more efficient and effective analysis of the queries than existing latent semantic indexing methods which always treat a query as a document that is projected into the same subspace. Typically, the decision as to whether to treat a query as a pseudo-document or as a set of terms is based upon the number of non-zero terms. As such, queries having large number of terms are processed in a conventional manner described above, while queries having fewer numbers of terms (generally in relation to the size of a typical document) are processed in a unique manner described below. The precise number of terms that a query must have to qualify to be treated as a pseudo-document can vary depending upon the application and is generally determined by experimentation.

In instances in which the query is to be treated as a set of terms, the method of this aspect of the present invention looks directly at the rows of the subspace representation $A_k$ to exploit the latent semantics captured in the subspace representation. Since only the rows of the subspace representation $A_k$ that correspond to the terms are analyzed, only these rows need be computed, thereby conserving processing time and resources. For example, a given query may contain two terms, term i and term j having equal importance. Thus, the query vector q can be defined as $q=e_i+e_j$, wherein $e_i$ and $e_j$ are the $i^{th}$ and $j^{th}$ unit vectors, respectively. In order to identify those documents in which both terms exist semantically, the conventional technique is to form a score vector by calculating the inner product $$s = q^T A_k$$
$$= (e_i + e_j)^T A_k$$
$$= a_i + a_j,$$

wherein $a_i$ and $a_j$ are the $i^{th}$ and $j^{th}$ rows of $A_k$ respectively. As known to those skilled in the art and as mentioned above, the score vector can be determined in a variety of other manners. Regardless of the manner in which the score vector is determined, the components of s are the scores of the respective documents. Unfortunately, this scoring technique is flawed since the various terms represented by $A_k$ are not weighted on a term-by-term basis. Accordingly, the high-frequency terms swamp the lower-frequency terms and may disadvantageously dominate the results. In a set of service bulletins at The Boeing Company consisting of 1,178 documents indexed by 3,514 terms, the term "engine" was present at a much greater frequency than the term "idle". As described below in more detail, in instances in which the presence of the term "idle" was as important or possibly more important than the presence of the term "engine", the resulting scores could be misleading since the higher frequencies associated with the term "engine" would generally dominate the resulting scores. See, for example, FIGS. 9A and 9B which graphically depicts the entries associated with the terms "engine" and "idle" for a plurality of the 1,178 documents, respectively.

As described above, globally weighting the terms prior to the projection of the working matrix A into the lower dimension subspace would greatly increase the difficulty associated with updating the document collection and may render the subspace representation unsuitable for applications such as the assignment of topic words. As such, the method, apparatus and computer program product of one aspect of the present invention weights only the respective rows of the subspace representation $A_k$ that relate to the terms identified by the query. See block 204. The relative importance of the terms of the query can be defined and the dominance of the high-frequency terms can therefore be abated, if desired. By weighting the rows of the subspace representation $A_k$ as opposed to the working matrix A, documents can be readily added and removed from the text document collection without re-indexing the entire document collection. In addition, the row weighting factors need not be defined for each row of the subspace representation $A_k$, but only those rows that relate to the terms defined by the query. By appropriately weighting the rows with a term-weighting matrix $W_t$ the scoring formula is now represented as:

$$s = q^T W_t A_k$$
$$= (e_i + e_j)^T W_t A_k$$
$$= \omega_i a_i + \omega_j a_j,$$

wherein $W_t = \text{diag}(\omega_1, \ldots, \omega_t)$ is a matrix with row weighting scalars in its diagonal. As indicated above, however, other scoring techniques can be utilized in conjunction with this aspect of the present invention with the foregoing formula presented for purposes of example and not of limitation.

Various techniques can be utilized to determine the relative weights of the rows of the subspace representation $A_k$. For example, the weights can be calculated as the inverse infinity norm that is defined as $\omega_i = 1/\|a_i\|_\infty$ wherein $\|a_i\|_\infty$ is the maximum of the absolute values of the elements of $a_i$. Alternatively, the weights can be calculated as the inverse 1-norm which is defined as $\omega_i = 1/\|a_i\|_1$ wherein $\|a_i\|_1$ is the sum of the absolute values of the elements of $a_i$. Still further, the weight can be calculated as the inverse 2-norm which is defined as $\omega_i = 1/\|a_i\|_2$ wherein $\|a_i\|_2$ is the square root of the sum of the squares of the elements of $a_i$.

The foregoing example minimizes the distinction between the steps represented by blocks 204 and 206. In block 204 the relevant rows of $A_k$ are selected and weighted; the selection being based on the keywords, and the weighting mitigating the effect of high-frequency terms. In block 206 a score vector is generated from these weighted rows. In the example above the score is produced by adding the two rows; however, a variety of scoring functions could be used. The entries in the weighted rows for each document could be combined into a score by, for example, taking the sum of their squares or taking the maximum entry. Regardless of the particular weighting and scoring methodology, the plurality of documents represented by the subspace representation $A_k$ can be scored with respect to the query and the documents can then be ranked in terms of score with the more relevant documents having a better score, as indicated in block 206. As a result of the weighting of those portions of the subspace representation $A_k$ that relate to the terms of the query, the resulting scores can be more meaningful and will not be unnecessarily swamped by high-frequency terms or by the disproportionate use of terms. Additionally, the resulting score will not be adversely impacted by query terms that are zero since these terms are not considered and are now properly treated as irrelevant. Those documents having the best score can then be retrieved as being relevant or most relevant with respect to the terms identified by the query, as indicated by block 208. A geometrical illustration of the importance of row weighting is depicted in FIGS. 10A and 10B. In this illustration, the documents are projected onto the 2-D plane spanned by the $i^{th}$ and $j^{th}$ terms, i.e., $a_i$ ("engines") and $a_j$ ("idle") are the x- and y-coordinates of the documents. The projected documents are initially represented by '·'. The scoring method using the inner product can be depicted as a line with a slope of −1 that moves from the far upper-right corner to the lower-left corner. The sorting result is equivalent to the order in which the documents are touched by the moving line. In FIG. 10A, the 20 documents having the best unweighted scores are marked with '+', and the scoring line is drawn so as to separate these 20 documents from the rest of the corpus. Note that only documents containing many occurrences of "engines" are selected. In FIG. 10B, term-weights have been applied based upon the inverse 2-norm weighting technique and the 20 documents having the best weighted scores are maked with 'o'. It is clear that the weighting scalars boost the contribution of $a_j$, "idle", giving it parity with $a_i$, "engines". These results will be hereinafter examined in more detail.

As an example of this aspect to the present invention, a text data collection consisting of 1,178 unique documents indexed on 3,514 terms was queried. As previously explained, each of the documents was a service bulletin of The Boeing Company and consisted of two parts, namely, a subject and a body. According to this aspect of the present invention, bodies of the documents were preprocessed and indexed and a subspace representation $A_k$ was obtained via TURV with k=55. Since $A_k$ is a dense matrix, $A_k$ need not ever be formed explicitly. Instead, by utilizing the matrices R and V in partial rows of U, the rows of $A_k$ that relate or otherwise correspond to the terms of a query can be determined or computed as necessary.

For point of comparison, the unweighted scoring method defined above was tested with two queries, namely, a first query for the term "engines" and a second query for the terms "engines" and "idle". In this particular example, the term "engines" occurred with much greater frequency, appearing in 566 documents in contrast to the 76 documents in which the term "idle" appeared. The results of the unweighted scoring method are depicted in Table 1 in which the 10 documents having the best scores for the two queries are listed. In this regard, the documents are listed by a respective index assigned to each document, i.e., document number 52, document number 245, etc.

TABLE 1

| Rank | engines | engines + idle |
|------|---------|----------------|
| 1 | 52 | 245 |
| 2 | 245 | 52 |
| 3 | 247 | 238 |
| 4 | 46 | 247 |
| 5 | 238 | 57 |
| 6 | 56 | 40 |
| 7 | 40 | 229 |
| 8 | 229 | 46 |
| 9 | 42 | 42 |
| 10 | 57 | 221 |

Although the results of the two queries have some difference in the order of the documents, the results clearly indicate that the term "engines" dominates the results. For point of reference, the data upon which Table 1 is based is illustrated in FIGS. 9A and 9B.

The same collection of documents was then scored with respect to the query for the terms "engines" and "idle" following weighting of the respective terms utilizing the inverse 2-norm weighting technique. The 10 documents having the best unweighted and weighted scores are depicted in Table 2 hereinbelow. The 10 documents having the best scores as a result of the application of an IDF term weighting factor to a subspace representation generated from the term document matrix by applying traditional 2-sided weighting functions is also provided for comparison purpose.

TABLE 2

| Rank | Unweighted score | Weighted score | IDF |
|------|------------------|----------------|------|
| 1 | 245 | 1024 | 1022 |
| 2 | 52 | 656 | 240 |
| 3 | 238 | 654 | 1024 |
| 4 | 247 | 1023 | 1023 |
| 5 | 57 | 652 | 652 |
| 6 | 40 | 653 | 652 |
| 7 | 229 | 1022 | 654 |
| 8 | 46 | 57 | 39 |
| 9 | 42 | 238 | 236 |
| 10 | 221 | 221 | 656 |

Additionally, a manual screening of the documents was conducted and the 7 documents that are most relevant to the query consisting of the terms "engines" and "idle" were identified. The subject lines and the indices for each of these 7 most relevant documents are listed below:

652: ENGINE FUEL AND CONTROL (CF6-80C2 FADEC ENGINES)—FUEL CONTROL SYSTEM—MINIMUM IDLE REVISION

654: ENGINE CONTROL (CF6-FADEC ENGINES)—ENGINE IDLE CONTROL SYSTEM—INSPECTION

653: ENGINE FUEL AND CONTROL (PW4000 ENGINE)—FUEL CONTROL SYSTEM—MINIMUM IDLE REVISION

656: ENGINE CONTROL (CF6-80C2 FADEC ENGINES)—ENGINE IDLE CONTROL SYSTEM—INSPECTION

1022: IGNITION (CF6-80C2 ENGINES)—IGNITION GENERAL—ENGINE IGNITION SYSTEM—MINIMUM IDLE REVISION

1023: IGNITION (PW4000 ENGINES)—IGNITION GENERAL—ENGINE IGNITION SYSTEM—MINIMUM IDLE REVISION

1024: ENGINE CONTROL (CF6-80C2 FADEC ENGINES)—ENGINE IDLE CONTROL SYSTEM—INSPECTION

As will be noted, the 10 best scoring documents utilizing the weighted scoring technique not only include each of the 7 documents, as indicated by bold face type, but have the 7 most relevant documents ranked as the best scoring documents. This example of utilizing verse 2-norm row-weighting is graphically depicted in FIG. 10B. In contrast, the unweighted scoring technique did not identify any of the 7 most relevant documents.

As a further example, a query is based upon the subject lines "airplane general—airplane systems modification for higher altitude airfield operation-JT8D-17 series engines." Once stop words, including "airplane" in this domain, have been removed, 10 terms remain as listed below along with the number of occurrences in the text document collection

| JT(957) | High(168) |
|---------|-----------|
| engines(566) | Altitude(89) |
| operation(272) | General(51) |
| modification(250) | Series(23) |
| systems(220) | Airfield(12) |

As the result of manual screening of the documents, the documents having indices 1–7 were independently determined to be most relevant to this query. As depicted in Table 3 hereinbelow, the 10 documents having the best scores based upon an inverse 2-norm weighted scoring technique and an IDF term weighting factor are listed with the most relevant documents indicated with bold face type. Again, the weighted scoring technique has identified the most relevant documents as the 7 best scoring documents.

TABLE 3

| Rank | Weighted score | IDF |
|---|---|---|
| 1 | 3 | 240 |
| 2 | 6 | 39 |
| 3 | 4 | 236 |
| 4 | 7 | 42 |
| 5 | 2 | 2 |
| 6 | 1 | 52 |
| 7 | 5 | 45 |
| 8 | 648 | 232 |
| 9 | 651 | 235 |
| 10 | 56 | 43 |

Finally, the unique subject lines of 1,026 documents were utilized as separate queries with a search being termed a success if the 10 documents having the best scores for a particular query included the bodies of the documents corresponding to the subject line that formed the query. For comparison purposes, a conventional scoring technique that treats a query as a pseudo-document was compared with the weighted scoring techniques of the present invention utilizing inverse infinity-norm, inverse 1-norm and inverse 2-norm scoring techniques with the results tabulated below.

TABLE 3

| Method | successful queries | success rate |
|---|---|---|
| Pseudo-document | 741 | 72.2% |
| Inverse infinity-norm | 843 | 82.2% |
| Inverse one-norm | 846 | 82.5% |
| Inverse two-norm | 856 | 83.4% |

As illustrated by the foregoing examples, the information retrieval technique of this aspect of the present invention provides more reliable and accurate results due to the weighting of the terms, i.e., rows, of the subspace representation $A_k$ that correspond to the terms of the query. In addition, by only computing those rows of the subspace representation that correspond to the terms of the query and by only weighting those same portions of the subspace representation, the efficiency of the information retrieval process technique of the present invention is also improved and the ease with which new documents can be added or old documents removed from the text document collection is enhanced since the entire matrix of row weighting factors need not be recomputed with each change to the text document collection. Moreover, by analyzing the query as a set of terms as opposed to a pseudo-document, the accuracy of the results are further improved since terms that are not included in the query are irrelevant with respect to the computation of the resulting score, as opposed to being treated as terms that occur with a below average frequency by conventional scoring techniques that treat a query as a pseudo-document.

Referring back to decision block 202 in FIG. 2, in those instances in which the query is treated as a pseudo-document, the processing then proceeds in much the same fashion as described above and in more detail in the '888 application. In this regard, a query frequency vector is computed and the entries in the query vector are then statistically transformed according to a statistical transformation policy as shown in blocks 220 and 222, respectively. Thereafter, the query vector is projected into the k-dimensional subspace as shown in block 224. The similarity between the query vector and the document vectors is then determined by measuring the distance therebetween. See block 226. The documents can then be scored and may be presented in a ranked order as depicted in block 228. Further details of this process can be found in the '888 application, the contents of which have been incorporated by reference. As such, the method, apparatus and computer program product of the present invention can advantageously support different types of processing of the query depending upon the nature of the query itself, thereby providing more efficient analysis of the queries than existing latent semantic indexing methods which unilaterally treat a query as a document that is projected into the same subspace.

In an analogous manner to the information retrieval technique described above and depicted in FIG. 6, documents can be classified into none, one or more of a plurality of predefined classes as shown in FIGS. 7 and 8. In this regard, the plurality of predefined classes are defined by a term-by-class matrix with each predefined class including at least one term. Referring now to the logic of FIG. 7 and, in particular, to block 300, a decision is initially made as to whether the training document is new in which case a term-by-class matrix must be constructed, or preexisting in which case a term-by-class matrix exists and can be utilized. If a term-by-class matrix is to be constructed, a term list is initially generated as depicted in block 304. In this regard and as with any classification method, there is a training phase where a training sample is used to determine a classifier and a classification phase that uses this classifier to determine the manner in which new documents will be classified into classes. According to this aspect of the present invention, a term-by-class matrix is formed based on a set of documents whose class membership is already known, i.e., the training sample. See block 306 in general and in blocks 151, 153 and 155 of FIG. 3B for more detail. The entries of this matrix are the frequencies of the terms in the documents that belong to a given class. A transformation for generating a subspace representation of the classes is then generated from the matrix by using a two-sided orthogonal decomposition, analogous to the indexing of a term-by-document matrix D for information retrieval. See, for example, FIG. 3B. This constitutes the training phase of the classifier.

If it is thereafter determined that a document classification operation is to be performed in block 308, the logic proceeds to block 310, the details of which are set forth in FIG. 8. As shown in block 210 of FIG. 8, a representation of the new document to be classified is received. The document is represented as a collection of terms. Those portions of the subspace representation $A_k$ of the term-by-class matrix that relate to the terms of the document to be classified are then weighted, such as by the inverse infinity norm, inverse 1-norm or inverse 2-norm weighting techniques described above. See block 214. The relationship for the new document to each predefined class is then scored in the same manner described above in conjunction with the scoring of query relative to a plurality of documents. See block 216. The new document may then be classified into none, one or more of the plurality of predefined classes based upon the scores of the relationship of the new document to each predefined class. See block 218. In this regard, the new document is typically classified into each predefined class for which the respective score meets a predetermined criteria. As such, the techniques described in more detail in conjunction with information retrieval can also be applied in an analogous fashion to the classification of documents into a plurality of predefined classes without departing from the spirit and scope of the present invention. Accordingly, the document classification technique of this aspect of the present invention also provides comparable advantages both in terms of efficiency, reliability and accuracy as further described above in conjunction with the information retrieval aspect of the present invention.

FIGS. 1–8 are block diagram, flowchart and control flow illustrations of methods, apparatus and computer program products according to the invention. It will be understood that each block or step of the block diagram, flowchart and control flow illustrations, and combinations of blocks in the block diagram, flowchart and control flow illustrations, can be implemented by computer program instructions or other means. Although computer program instructions are discussed hereinbelow, for example, an apparatus according to the present invention can include other means, such as hardware or some combination of hardware and software, including one or more processors or controllers for performing the information retrieval and/or document classification.

In this regard, FIG. 11 depicts the apparatus of one embodiment including several of the key components of a general purpose computer 50 on which the present invention may be implemented. Those of ordinary skill in the art will appreciate that a computer includes many more components than those shown in FIG. 11. However, it is not necessary that all of these generally conventional components be shown in order to disclose an illustrative embodiment for practicing the invention. The computer 50 includes a processing unit 60 and a system memory 62 which includes random access memory (RAM) and read-only memory (ROM). The computer also includes nonvolatile storage 64, such as a hard disk drive, where data is stored. The apparatus of the present invention can also include one or more input devices 68, such as a mouse, keyboard, etc. A display 66 is provided for viewing text mining data, and interacting with a user interface to request text mining operations. The apparatus of the present invention may be connected to one or more remote computers 70 via a network interface 72. The connection may be over a local area network (LAN) wide area network (WAN), and includes all of the necessary circuitry for such a connection. In one embodiment of the present invention, the document collection includes documents on an Intranet. Other embodiments are possible, including: a local document collection, i.e., all documents on one computer, documents stored on a server and/or a client in a network environment, etc.

Typically, computer program instructions may be loaded onto the computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto the computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of retrieving information from a text data collection that comprises a plurality of documents with each document comprised of a plurality of terms, wherein the text data collection is represented by a term-by-document matrix having a plurality of entries with each entry being the frequency of occurrence of a term in a respective document, and wherein the method comprises:

receiving a query;

projecting a representation of at least a portion of the term-by-document matrix into a lower dimensional subspace to thereby create at least those portions of a subspace representation $A_k$ relating to a term identified by the query;

weighting at least those portions of a subspace representation $A_k$ relating to a term identified by the query following the projection into the lower dimensional subspace;

scoring the plurality of documents with respect to the query based at least partially upon the weighted portion of the subspace representation $A_k$; and identifying respective documents based upon relative scores of the documents with respect to the query.

2. A method according to claim 1 wherein the subspace representation $A_k$ includes a plurality of rows corresponding to respective terms, and wherein said weighting comprises determining an inverse infinity norm of the term.

3. A method according to claim 1 wherein the subspace representation $A_k$ includes a plurality of rows corresponding to respective terms, and wherein said weighting comprises determining an inverse 1-norm of the term.

4. A method according to claim 1 wherein the subspace representation $A_k$ includes a plurality of rows corresponding to respective terms, and wherein said weighting comprises determining an inverse 2-norm of the term.

5. A method according to claim 1 further comprising weighting the term-by-document matrix on a document-by-document basis prior to the projection into the lower dimensional subspace.

6. A method according to claim 1 wherein the projection into the lower dimensional subspace comprises obtaining an orthogonal decomposition of the representation of the term-by-document matrix into a k-dimensional subspace.

7. A method of classifying a document with respect to a plurality of predefined classes defined by a term-by-class matrix with each predefined class including at least one term, wherein the method comprises:

receiving a representation of the document to be classified;

projecting a representation of at least a portion of the term-by-class matrix into a lower dimensional subspace to thereby create at least those portions of a subspace representation $A_k$ relating to a term included within the representation of the document to be classified;

weighting at least those portions of the subspace representation $A_k$ relating to a term included within the representation of the document to be classified following the projection into the lower dimensional subspace;

scoring the relationship of the document to each predefined class based at least, partially upon the weighted portion of the subspace representation $A_k$;

determining if the document is to be classified into any of the plurality of predefined classes based upon the scores of the relationship of the document to each predefined class; and classifying the document into at least one of the plurality of predefined classes if so determined based upon the scores of the relationship of the document to each predefined class.

8. A method according to claim 7 wherein the subspace representation $A_k$ includes a plurality of rows corresponding to respective terms, and wherein said weighting comprises determining an inverse infinity norm of the term.

9. A method according to claim 7 wherein the subspace representation $A_k$ includes a plurality of rows corresponding to respective terms, and wherein said weighting comprises determining an inverse 1-norm of the term.

10. A method according to claim 7 wherein the subspace representation $A_k$ includes a plurality of rows corresponding to respective terms, and wherein said weighting comprises determining an inverse 2-norm of the term.

11. A method according to claim 7 further comprising weighting the term-by-class matrix on a class-by-class basis prior to the projection into the lower dimensional subspace.

12. A method according to claim 7 wherein the projection into the lower dimensional subspace comprises obtaining an orthogonal decomposition of the representation of the term-by-class matrix into a k-dimensional subspace.

13. A method retrieving information from a text data collection that comprises a plurality of documents with each document comprised of a plurality of terms, wherein the text data collection is represented by a term-by-document matrix having a plurality of entries with each entry being the frequency of occurrence of a term in a respective document, and wherein the method comprises:

receiving a query;

determining if the query is to be treated as a pseudo-document or as a set of terms;

processing the query depending upon the treatment of the query as a pseudo-document or as a set of terms;

scoring the plurality of documents with respect to the query based upon said processing of the query; and identifying respective documents based upon relative scores of the documents with respect to the query.

14. A method according to claim 13 wherein the processing of the query in instances in which the query is treated as a set of terms comprises:

projecting a representation of at least a portion of the term-by-document matrix into a lower dimensional subspace to thereby create at least those portions of a subspace representation $A_k$ corresponding to a term identified by the query; and weighting at least those portions of a subspace representation $A_k$ corresponding to a term identified by the query following the projection into the lower dimensional subspace, and wherein said scoring comprises scoring the plurality of documents with respect to the query based at least partially upon the weighted portion of the subspace representation $A_k$.

15. A method according to claim 13 wherein the processing of the query in instances in which the query is treated as a pseudo-document comprises:

projecting a representation of at least a portion of the term-by-document matrix into a lower dimensional subspace;

projecting a query vector representative of the query into the lower dimensional subspace; and comparing the projection of the query vector and the representation of at least a portion of the term-by-document matrix, and wherein said scoring comprises scoring the plurality of documents with respect to the query based at least partially upon the comparison of the projection of the query vector and the representation of at least a portion of the term-by-document matrix.

16. A computer program product for retrieving information from a text data collection that comprises a plurality of documents with each document comprised of a plurality of terms, wherein the text data collection is represented by a term-by-document matrix having a plurality of entries with each entry being the frequency of occurrence of a term in a respective document, wherein the computer program product comprises a computer-readable storage medium having computer-readable program code means embodied in said medium, and wherein said computer-readable program code means comprises:

first computer-readable program code means for receiving a query;

second computer-readable program code means for projecting a representation of at least a portion of the term-by-document matrix into a lower dimensional subspace to thereby create at least those portions of a subspace representation $A_k$ relating to a term identified by the query;

third computer-readable program code means for weighting at least those portions of a subspace representation $A_k$ relating to a term identified by the query following the projection into the lower dimensional subspace; and fourth computer-readable program code means for scoring the plurality of documents with respect to the query based at least partially upon the weighted portion of the subspace representation $A_k$.

17. A computer program product according to claim 16 wherein the subspace representation $A_k$ includes a plurality of rows corresponding to respective terms, and wherein said third computer-readable program code means determines an inverse infinity norm of the term.

18. A computer program product according to claim 16 wherein the subspace representation $A_k$ includes a plurality of rows corresponding to respective terms, and wherein said third computer-readable program code means determines an inverse 1-norm of the term.

19. A computer program product according to claim 16 wherein the subspace representation $A_k$ includes a plurality of rows corresponding to respective terms, and wherein said third computer-readable program code means determines an inverse 2-norm of the term.

20. A computer program product according to claim 16 further comprising fifth computer-readable program code means for weighting the term-by-document matrix on a document-by-document basis prior to the projection into the lower dimensional subspace.

21. A computer program product according to claim 16 wherein said second computer-readable program code means obtains an orthogonal decomposition of the representation of the term-by-document matrix into a k-dimensional subspace.

22. A computer program product according to claim 16 further comprising sixth computer-readable program code means for identifying respective documents based upon relative scores of the documents with respect to the query.

23. A computer program product for classifying a document with respect to a plurality of predefined classes defined by a term-by-class matrix with each predefined class including at least one term, wherein the computer program product comprises a computer-readable storage medium having computer-readable program code means embodied in said medium, and wherein said computer-readable program code means comprises:
    first computer-readable program code means for receiving a representation of the document to be classified;
    second computer-readable program code means for projecting a representation of at least a portion of the term-by-class matrix into a lower dimensional subspace to thereby create at least those portions of a subspace representation $A_k$ relating to a term included within the representation of the document to be classified;
    third computer-readable program code means for weighting at least those portions of the subspace representation $A_k$ relating to a term included within the representation of the document to be classified following the projection into the lower dimensional subspace;
    fourth computer-readable program code means for scoring the relationship of the document to each predefined class based at least partially upon the weighted portion of the subspace representation $A_k$; and
    fifth computer-readable program code means for determining if the document is to be classified into any of the plurality of predefined classes based upon the scores of the relationship of the document to each predefined class.

24. A computer program product according to claim 23 wherein the subspace representation $A_k$ includes a plurality of rows corresponding to respective terms, and wherein said third computer-readable program code means determines an inverse infinity norm of the term.

25. A computer program product according to claim 23 wherein the subspace representation $A_k$ includes a plurality of rows corresponding to respective terms, and wherein said third computer-readable program code means determines an inverse 1-norm of the term.

26. A computer program product according to claim 23 wherein the subspace representation $A_k$ includes a plurality of rows corresponding to respective terms, and wherein said third computer-readable program code means determines an inverse 2-norm of the term.

27. A computer program product according to claim 23 further comprising sixth computer-readable program code means for weighting the term-by-class matrix on a class-by-class basis prior to the projection into the lower dimensional subspace.

28. A computer program product according to claim 23 wherein said second computer-readable program code means obtains an orthogonal decomposition of the representation of the term-by-class into matrix a k-dimensional subspace.

29. A computer program product for retrieving information from a text data collection that comprises a plurality of documents with each document comprised of a plurality of terms, wherein the text data collection is represented by a term-by-document matrix having a plurality of entries with each entry being the frequency of occurrence of a term in a respective document, wherein the computer program product comprises a computer-readable storage medium having computer-readable program code means embodied in said medium, and wherein said computer-readable program code means comprises:
    first computer-readable program code means for receiving a query;
    second computer-readable program code means for determining if the query is to be treated as a pseudo-document or as a set of terms;
    third computer-readable program code means for processing the query depending upon the treatment of the query as a pseudo-document or as a set of terms; and
    fourth computer-readable program code means for scoring the plurality of documents with respect to the query based upon said processing of the query.

30. A computer program product according to claim 29 wherein said third computer-readable program code means comprises:
    fifth computer-readable program code means, operable in instances in which the query is treated as a set of terms, for projecting a representation of at least a portion of the term-by-document matrix into a lower dimensional subspace to thereby create at least those portions of a subspace representation $A_k$ corresponding to a term identified by the query; and
    sixth computer-readable program code means, also operable in instances in which the query is treated as a set of terms, for weighting at least those portions of a subspace representation $A_k$ corresponding to a term identified by the query following the projection into the lower dimensional subspace,
    and wherein said fourth computer-readable program code means scores the plurality of documents with respect to the query based at least partially upon the weighted portion of the subspace representation $A_k$ in instances in which the query is treated as a set of terms.

31. A computer program product according to claim 29 wherein said third computer-readable program code means comprises:
    fifth computer-readable program code means, operable in instances in which the query is treated as a pseudo-document, for projecting a representation of at least a portion of the term-by-document matrix into a lower dimensional subspace;
    sixth computer-readable program code means, also operable in instances in which the query is treated as a pseudo-document, for projecting a query vector representative of the query into the lower dimensional subspace; and
    seventh computer-readable program code means, further operable in instances in which the query is treated as a pseudo-document, for comparing the projection of the query vector and the representation of at least a portion of the term-by-document matrix, and wherein said fourth computer-readable program code means scores the plurality of documents with respect to the query based at least partially upon the comparison of the projection of the query vector and the representation of at least a portion of the term-by-document matrix in instances in which the query is treated as a pseudo-document.

32. An apparatus for retrieving information from a text data collection that comprises a plurality of documents with each document comprised of a plurality of terms, wherein the text data collection is represented by a term-by-document matrix having a plurality of entries with each entry being the frequency of occurrence of a term in a respective document, and wherein the apparatus comprises:

means for receiving a query;

means for projecting a representation of at least a portion of the term-by-document matrix into a lower dimensional subspace to thereby create at least those portions of a subspace representation $A_k$ relating to a term identified by the query;

means for weighting at least those portions of the subspace representation $A_k$ relating to a term identified by the query following the projection into the lower dimensional subspace; and means for scoring the plurality of documents with respect to the query based at least partially upon the weighted portion of the subspace representation $A_k$.

33. An apparatus according to claim 32 wherein the subspace representation $A_k$ includes a plurality of rows corresponding to respective terms, and wherein said means for weighting comprises means for determining an inverse infinity norm of the term.

34. An apparatus according to claim 32 wherein the subspace representation $A_k$ includes a plurality of rows corresponding to respective terms, and wherein said means for weighting comprises means for determining an inverse 1-norm of the term.

35. An apparatus according to claim 32 wherein the subspace representation $A_k$ includes a plurality of rows corresponding to respective terms, and wherein said means for weighting comprises means for determining an inverse 2-norm of the term.

36. An apparatus according to claim 32 further comprising means for weighting the term-by-document matrix on a document-by-document basis prior to the projection into the lower dimensional subspace.

37. An apparatus according to claim 32 wherein said means for projecting a representation of at least a portion of the term-by-document matrix into a lower dimensional subspace comprises means for obtaining an orthogonal decomposition of the representation of the term-by-document matrix into a k-dimensional subspace.

38. An apparatus according to claim 32 further comprising means for identifying respective documents based upon relative scores of the documents with respect to the query.

39. An apparatus for classifying a document with respect to a plurality of predefined classes defined by a term-by-class matrix with each predefined class including at least one term, wherein the apparatus comprises:

means for receiving a representation of the document to be classified;

means for projecting a representation of at least a portion of the term-by-class matrix into a lower dimensional subspace to thereby create at least those portions of a subspace representation $A_k$ relating to a term included within the representation of the document to be classified;

means for weighting at least those portions of the subspace representation $A_k$ relating to a term included within the representation of the document to be classified following the projection into the lower dimensional subspace;

means for scoring the relationship of the document to each predefined class based at least partially upon the weighted portion of the subspace representation $A_k$; and means for determining if the document is to be classified into any of the plurality of predefined classes based upon the scores of the relationship of the document to each predefined class.

40. An apparatus according to claim 39 wherein the subspace representation $A_k$ includes a plurality of rows corresponding to respective terms, and wherein said means for weighting comprises means for determining an inverse infinity norm of the term.

41. An apparatus according to claim 39 wherein the subspace representation $A_k$ includes a plurality of rows corresponding to respective terms, and wherein said means for weighting comprises means for determining an inverse 1-norm of the term.

42. An apparatus according to claim 39 wherein the subspace representation $A_k$ includes a plurality of rows corresponding to respective terms, and wherein said means for weighting comprises means for determining an inverse 2-norm of the term.

43. An apparatus according to claim 39 further comprising means for weighting the term-by-class matrix on a class-by-class basis prior to the projection into the lower dimensional subspace.

44. An apparatus according to claim 39 wherein said means for projecting a representation of at least a portion of the term-by-class matrix into a lower dimensional subspace comprises means for obtaining an orthogonal decomposition of the representation of the term-by-class matrix into a k-dimensional subspace.

45. An apparatus for retrieving information from a text data collection that comprises a plurality of documents with each document comprised of a plurality of terms, wherein the text data collection is represented by a term-by-document matrix having a plurality of entries with each entry being the frequency of occurrence of a term in a respective document, and wherein the apparatus comprises:

means for receiving a query;

means for determining if the query is to be treated as a pseudo-document or as a set of terms;

means for processing the query depending upon the treatment of the query as a pseudo-document or as a set of terms; and means for scoring the plurality of documents with respect to the query based upon said processing of the query.

46. An apparatus according to claim 45 wherein said means for processing comprises:

means, operable in instances in which the query is treated as a set of terms, for projecting a representation of at least a portion of the term-by-document matrix into a lower dimensional subspace to thereby create at least those portions of a subspace representation $A_k$ corresponding to a term identified by the query; and means, also operable in instances in which the query is treated as a set of terms, for weighting at least those portions of a subspace representation $A_k$ corresponding to a term identified by the query following the projection into the lower dimensional subspace, and wherein means for scoring scores the plurality of documents with respect to the query based at least partially upon the weighted portion of the subspace representation $A_k$ in instances in which the query is treated as a set of terms.

47. An apparatus according to claim 45 wherein said means for processing comprises:

means, operable in instances in which the query is treated as a pseudo-document, for projecting a representation of at least a portion of the term-by-document matrix into a lower dimensional subspace;

means, also operable in instances in which the query is treated as a pseudo-document, for projecting a query vector representative of the query into the lower dimensional subspace; and means, further operable in instances in which the query is treated as a pseudo-document, for comparing the projection of the query vector and the representation of at least a portion of the term-by-document matrix, and wherein said means for scoring scores the plurality of documents with respect to the query based at least partially upon the comparison of the projection of the query vector and the representation of at least a portion of the term-by-document matrix in instances in which the query is treated as a pseudo-document.

* * * * *